(12) United States Patent
Jenkins et al.

(10) Patent No.: US 9,803,307 B2
(45) Date of Patent: Oct. 31, 2017

(54) CLEANING METHOD

(75) Inventors: Stephen Derek Jenkins, Cleveland (GB); Frazer John Kennedy, South Yorkshire (GB)

(73) Assignee: Xeros Limited, Rotherham (GB)

( * ) Notice: Subject to any disclaimer, the term of this patent is extended or adjusted under 35 U.S.C. 154(b) by 1110 days.

(21) Appl. No.: 13/979,392

(22) PCT Filed: Jan. 16, 2012

(86) PCT No.: PCT/GB2012/050085
§ 371 (c)(1),
(2), (4) Date: Jul. 12, 2013

(87) PCT Pub. No.: WO2012/095677
PCT Pub. Date: Jul. 19, 2012

(65) Prior Publication Data
US 2013/0283542 A1    Oct. 31, 2013

(30) Foreign Application Priority Data

Jan. 14, 2011 (GB) .................................. 1100627.7

(51) Int. Cl.
*D06F 35/00*  (2006.01)
*C11D 17/04*  (2006.01)
(Continued)

(52) U.S. Cl.
CPC ............ *D06F 35/006* (2013.01); *C11D 3/124* (2013.01); *C11D 3/1206* (2013.01);
(Continued)

(58) Field of Classification Search
None
See application file for complete search history.

(56) References Cited

U.S. PATENT DOCUMENTS

| 2,970,464 A | 2/1961 | Toma |
| 3,321,843 A | 5/1967 | Taran et al. |

(Continued)

FOREIGN PATENT DOCUMENTS

| CA | 1284407 C | 5/1991 |
| CN | 1723008 A | 1/2006 |

(Continued)

OTHER PUBLICATIONS

U.S. Appl. No. 14/427,046, Xeros Ltd.
(Continued)

*Primary Examiner* — Jason Ko
*Assistant Examiner* — Spencer Bell
(74) *Attorney, Agent, or Firm* — Clark & Elbing LLP

(57) ABSTRACT

The invention provides a method for the cleaning of a soiled substrate, the method comprising treating the substrate with a non-polymeric solid particulate cleaning material and wash water, the treatment being carried out in an apparatus comprising a drum comprising perforated side walls and having a capacity of between 5 and 50 liters for each kg of fabric in the washload, wherein the solid particulate cleaning material comprises a multiplicity of non-polymeric particles at a particle to fabric addition level of 0.1:1-10:1 by mass, each of the particles being substantially cylindrical or spherical in shape, and wherein the drum comprising perforated side walls is rotated at a speed which generates G forces in the range of from 0.05 to 900 G. The non-polymeric particles may comprise particles of glass, silica, stone, wood, or any of a variety of metals or ceramic materials. Preferably the solid particulate cleaning material additionally comprises a multiplicity of polymeric particles each of which is substantially cylindrical or spherical in shape. Preferably, at least one detergent is employed in the cleaning process. The invention provides optimum cleaning (Continued)

Cylindrical, Spherical and Perfect Sphere Size Parameters performance as a result of improved mechanical interaction between substrate and cleaning media and is preferably used for the cleaning of textile fabrics. The method allows for significant reductions in the consumption of detergents, water and energy when compared with the conventional wet cleaning of textile fabrics, and also facilitates reduced washing-related textile fabric damage. The invention also envisages a cleaning composition comprising a solid particulate cleaning composition and at least one additional cleaning agent.

16 Claims, 3 Drawing Sheets

(51) Int. Cl.
| | | |
|---|---|---|
| C11D 3/37 | (2006.01) | |
| C11D 7/02 | (2006.01) | |
| C11D 3/382 | (2006.01) | |
| C11D 11/00 | (2006.01) | |
| C11D 3/14 | (2006.01) | |
| C11D 3/12 | (2006.01) | |
| C11D 7/20 | (2006.01) | |
| C11D 7/40 | (2006.01) | |
| C11D 7/44 | (2006.01) | |

(52) U.S. Cl.
CPC .............. *C11D 3/1213* (2013.01); *C11D 3/14* (2013.01); *C11D 3/37* (2013.01); *C11D 3/3715* (2013.01); *C11D 3/3719* (2013.01); *C11D 3/3726* (2013.01); *C11D 3/3749* (2013.01); *C11D 3/382* (2013.01); *C11D 7/02* (2013.01); *C11D 7/20* (2013.01); *C11D 7/44* (2013.01); *C11D 11/0017* (2013.01); *C11D 17/046* (2013.01); *Y02B 40/56* (2013.01)

(56) References Cited

U.S. PATENT DOCUMENTS

| | | |
|---|---|---|
| 3,333,344 A | 8/1967 | Loewen |
| 3,647,354 A | 3/1972 | Loeb |
| 3,650,673 A | 3/1972 | Ehner |
| 3,805,406 A | 4/1974 | Castonoli |
| 4,055,248 A | 10/1977 | Marsan |
| 4,130,392 A | 12/1978 | Diehl et al. |
| 4,188,807 A | 2/1980 | Graf et al. |
| 4,326,971 A | 4/1982 | Wixon |
| 4,374,443 A | 2/1983 | Mosell |
| 4,434,067 A | 2/1984 | Malone et al. |
| 4,493,783 A | 1/1985 | Su et al. |
| 4,575,887 A | 3/1986 | Viramontes |
| 4,637,890 A | 1/1987 | Crabtree et al. |
| 4,655,952 A | 4/1987 | Mesmer et al. |
| 4,750,227 A | 6/1988 | Hopkins et al. |
| 4,801,333 A | 1/1989 | Mosell |
| 4,809,854 A | 3/1989 | Tomaszek |
| 4,839,969 A | 6/1989 | Hahn |
| 4,951,366 A | 8/1990 | Geller |
| 4,978,619 A | 12/1990 | Kajiwara et al. |
| 5,245,722 A | 9/1993 | Dameron |
| 5,305,533 A | 4/1994 | Alexander et al. |
| 5,324,649 A | 6/1994 | Arnold et al. |
| 5,367,734 A | 11/1994 | Terry |
| 5,468,175 A | 11/1995 | Nilen |
| 5,475,992 A | 12/1995 | Wiegert |
| 5,503,840 A | 4/1996 | Jacobson et al. |
| 5,547,476 A | 8/1996 | Siklosi et al. |
| 5,601,480 A | 2/1997 | Nilen |
| 5,605,491 A | 2/1997 | Yam et al. |
| 5,667,431 A | 9/1997 | Mortin |
| 5,804,548 A | 9/1998 | Davis |
| 5,849,684 A | 12/1998 | Donoghue et al. |
| 5,925,195 A | 7/1999 | King et al. |
| 5,978,994 A | 11/1999 | Anderson |
| 5,980,620 A | 11/1999 | Brodie et al. |
| 5,993,839 A | 11/1999 | Mixon |
| 6,235,705 B1 | 5/2001 | Zembrodt et al. |
| 6,348,441 B1 | 2/2002 | Aiken, III et al. |
| 6,376,046 B1 | 4/2002 | Hoshino et al. |
| 6,448,212 B1 | 9/2002 | Holderbaum et al. |
| 6,764,992 B2 | 7/2004 | Kumar et al. |
| 7,015,156 B2 | 3/2006 | Maldonado et al. |
| 7,070,489 B2 | 7/2006 | Rogmark |
| 7,097,715 B1 | 8/2006 | Racette et al. |
| 7,481,893 B2 | 1/2009 | Motson et al. |
| 7,498,294 B2 | 3/2009 | Konno et al. |
| 7,700,539 B2 | 4/2010 | Muller et al. |
| 8,490,440 B2 | 7/2013 | Aykroyd et al. |
| 8,959,961 B2 | 2/2015 | Jenkins et al. |
| 8,974,545 B2 | 3/2015 | Burkinshaw et al. |
| 9,017,423 B2 | 4/2015 | Burkinshaw et al. |
| 9,121,000 B2 | 9/2015 | Burkinshaw et al. |
| 9,127,882 B2 | 9/2015 | Jenkins et al. |
| 9,297,107 B2 | 3/2016 | Jenkins |
| 9,315,766 B2 | 4/2016 | He et al. |
| 9,404,210 B2 | 8/2016 | He et al. |
| 9,410,278 B2 | 8/2016 | He et al. |
| 9,476,155 B2 | 10/2016 | He et al. |
| 9,487,898 B2 | 11/2016 | He et al. |
| 9,523,169 B2 | 12/2016 | Sawford et al. |
| 9,550,966 B2 | 1/2017 | Burkinshaw et al. |
| 2001/0031714 A1 | 10/2001 | Gassenmeier et al. |
| 2002/0010300 A1 | 1/2002 | Mimoun |
| 2002/0016282 A1 | 2/2002 | Kumar et al. |
| 2002/0039976 A1 | 4/2002 | Sebillotte-Arnaud et al. |
| 2002/0058595 A1 | 5/2002 | Kaiser |
| 2002/0133886 A1* | 9/2002 | Severns ............ B01J 20/28033 8/142 |
| 2003/0110580 A1 | 6/2003 | Burkinshaw et al. |
| 2003/0134759 A1 | 7/2003 | Geary et al. |
| 2004/0025262 A1 | 2/2004 | Hamers et al. |
| 2004/0171515 A1 | 9/2004 | Hamers et al. |
| 2004/0242133 A1 | 12/2004 | Arellano et al. |
| 2004/0266641 A1 | 12/2004 | Gentschev et al. |
| 2005/0148479 A1 | 7/2005 | Barthel et al. |
| 2005/0153865 A1 | 7/2005 | Detering et al. |
| 2005/0183206 A1 | 8/2005 | Brown et al. |
| 2005/0183208 A1 | 8/2005 | Scheper et al. |
| 2005/0204477 A1 | 9/2005 | Casella et al. |
| 2006/0189506 A1 | 8/2006 | Muller et al. |
| 2006/0287212 A1 | 12/2006 | Sommer et al. |
| 2007/0151312 A1 | 7/2007 | Bruce et al. |
| 2007/0270327 A1 | 11/2007 | Beck et al. |
| 2008/0090746 A1 | 4/2008 | Penninger |
| 2008/0223406 A1 | 9/2008 | Lindqvist et al. |
| 2008/0276965 A1 | 11/2008 | Aykroyd et al. |
| 2008/0306183 A1 | 12/2008 | Leukel et al. |
| 2009/0090138 A1 | 4/2009 | Wang |
| 2009/0186795 A1 | 7/2009 | Feenstra et al. |
| 2009/0217461 A1* | 9/2009 | Burkinshaw ......... C11D 3/3719 8/137 |
| 2009/0276966 A1 | 11/2009 | Mette et al. |
| 2010/0281928 A1 | 11/2010 | Martin |
| 2011/0296628 A1 | 12/2011 | Jenkins et al. |
| 2012/0048299 A1 | 3/2012 | Jenkins et al. |
| 2012/0060350 A1 | 3/2012 | Kwon et al. |
| 2012/0111359 A1 | 5/2012 | Mueller et al. |
| 2012/0284931 A1 | 11/2012 | Jenkins et al. |
| 2012/0304400 A1 | 12/2012 | Jenkins et al. |
| 2013/0061404 A1 | 3/2013 | Jenkins |
| 2013/0167882 A1 | 7/2013 | Burkinshaw et al. |
| 2013/0276242 A1 | 10/2013 | Jenkins et al. |
| 2013/0281345 A1 | 10/2013 | Burkinshaw et al. |
| 2013/0305560 A1 | 11/2013 | Jenkins et al. |
| 2013/0340487 A1 | 12/2013 | Yin et al. |
| 2014/0123402 A1 | 5/2014 | He et al. |
| 2014/0189961 A1 | 7/2014 | He et al. |
| 2014/0201929 A1 | 7/2014 | He et al. |
| 2014/0283314 A1 | 9/2014 | He et al. |
| 2014/0317860 A1 | 10/2014 | He et al. |

(56) References Cited

U.S. PATENT DOCUMENTS

| | | |
|---|---|---|
| 2015/0027173 A1 | 1/2015 | Wu et al. |
| 2015/0096128 A1 | 4/2015 | Sawford et al. |
| 2015/0096129 A1 | 4/2015 | Sawford et al. |
| 2015/0128358 A1 | 5/2015 | Wells et al. |
| 2015/0148278 A1 | 5/2015 | Burkinshaw et al. |
| 2015/0152357 A1 | 6/2015 | Abercrombie et al. |
| 2015/0152585 A1 | 6/2015 | Sawford et al. |
| 2015/0175945 A1 | 6/2015 | Waddon et al. |
| 2015/0252511 A1 | 9/2015 | Roberts et al. |
| 2015/0344824 A1 | 12/2015 | Burkinshaw et al. |
| 2016/0032522 A1 | 2/2016 | Steele |
| 2016/0040260 A1 | 2/2016 | Steele |
| 2016/0122932 A1 | 5/2016 | Wells et al. |
| 2016/0122936 A1 | 5/2016 | Wells et al. |
| 2016/0195409 A1 | 7/2016 | Goldberg et al. |
| 2016/0197998 A1 | 7/2016 | Carleo |
| 2016/0251602 A1 | 9/2016 | Steele et al. |
| 2016/0251603 A1 | 9/2016 | Steele et al. |
| 2016/0251795 A1 | 9/2016 | Wells et al. |

FOREIGN PATENT DOCUMENTS

| | | |
|---|---|---|
| CN | 2789299 Y | 6/2006 |
| CN | 101885605 A | 11/2010 |
| CN | 101886321 | 11/2010 |
| CN | 102061588 A | 5/2011 |
| CN | 102061589 A | 5/2011 |
| CN | 202401272 U | 8/2012 |
| CN | 202500017 U | 10/2012 |
| CN | 202543635 U | 11/2012 |
| DE | 1900002 A1 | 7/1970 |
| DE | 28 19 233 | 11/1979 |
| DE | 3527724 A1 | 2/1987 |
| DE | 3803195 A1 | 8/1989 |
| DE | 19505921 | 8/1996 |
| DE | 10247289 A1 | 4/2004 |
| DE | 102007029485 A1 | 1/2009 |
| DE | 102008009462 A1 | 8/2009 |
| DE | 102009046170 A1 | 5/2011 |
| EP | 0090372 A1 | 10/1983 |
| EP | 0171215 A1 | 2/1986 |
| EP | 0312278 A2 | 4/1989 |
| EP | 0477052 A1 | 3/1992 |
| EP | 0635595 A1 | 1/1995 |
| EP | 0807463 A2 | 11/1997 |
| EP | 1371718 A1 | 12/2003 |
| EP | 2103677 A1 | 9/2009 |
| FR | 2525645 A1 | 10/1983 |
| FR | 2826548 A1 | 1/2003 |
| GB | 920791 A | 3/1963 |
| GB | 1018318.4 | 1/1966 |
| GB | 1256064 A | 12/1971 |
| GB | 1297316 A | 11/1972 |
| GB | 1379742 A | 1/1975 |
| GB | 2249104 A | 4/1992 |
| GB | 2302553 A | 1/1997 |
| GB | 2365648 A | 2/2002 |
| GB | 2456407 A | 7/2009 |
| GB | 2473224 A | 3/2011 |
| JP | S5948078 A | 3/1984 |
| JP | S59-196758 A | 11/1984 |
| JP | H01285188 A | 11/1989 |
| JP | H0257295 A | 2/1990 |
| JP | 03146094 | 6/1991 |
| JP | H03-146094 B2 | 6/1991 |
| JP | H04105633 A | 7/1992 |
| JP | H04241165 A | 8/1992 |
| JP | H06240297 A | 8/1994 |
| JP | 2004-167345 A | 6/2004 |
| JP | 2004238602 | 8/2004 |
| JP | 2006-326434 A | 12/2006 |
| WO | WO-98/37270 A1 | 8/1998 |
| WO | WO-99/40251 A1 | 8/1999 |
| WO | WO 00/37540 A1 | 6/2000 |
| WO | WO-00/77153 A1 | 12/2000 |
| WO | WO-02/42403 A1 | 5/2002 |
| WO | WO-03/054128 A1 | 7/2003 |
| WO | WO-2004/066970 A1 | 8/2004 |
| WO | WO-2006/020789 A1 | 2/2006 |
| WO | WO-2006/040539 A1 | 4/2006 |
| WO | WO-2007/070520 A1 | 6/2007 |
| WO | WO-2007/128962 A1 | 11/2007 |
| WO | WO-2008/132456 A1 | 11/2008 |
| WO | WO-2009/021919 A2 | 2/2009 |
| WO | WO2009/112296 | 9/2009 |
| WO | WO-2009/134018 A2 | 11/2009 |
| WO | WO-2010/046473 A1 | 4/2010 |
| WO | WO-2010/094959 A1 | 8/2010 |
| WO | WO-2010/128337 A2 | 11/2010 |
| WO | WO-2010/133837 A1 | 11/2010 |
| WO | WO-2010/139689 A1 | 12/2010 |
| WO | WO-2011/015429 A2 | 2/2011 |
| WO | WO-2011/051140 A1 | 5/2011 |
| WO | WO-2011/064581 A1 | 6/2011 |
| WO | WO-2011/098815 A1 | 8/2011 |
| WO | WO-2011/128676 A1 | 10/2011 |
| WO | WO-2012/084619 A1 | 6/2012 |
| WO | WO-2012/098408 A2 | 7/2012 |
| WO | WO-2012/104861 A1 | 8/2012 |
| WO | WO-2012/140442 A1 | 10/2012 |
| WO | WO-2014/037729 A1 | 3/2014 |
| WO | WO-2015/004444 A1 | 1/2015 |

OTHER PUBLICATIONS

U.S. Appl. No. 14/588,500, Xeros Ltd.
U.S. Appl. No. 14/588,510, Xeros Ltd.
"Aqua Ball Set", <http://www.auravita.com/products/AURA/TAPR10610.asp>, retrieved on Aug. 14, 2006 (3 pages).
"Capture Carpet Cleaning Kit", <http://www.basichomeshopping.com/CaptureCarpetCleanerKit.html>, retrieved on Aug. 11, 2005 (4 pages).
"Capture Carpet Cleaning Kit", <http://www.domesticsale.com/Classifieds/15175.html>, retrieved on Aug. 11, 2005 (1 page).
International Search Report and Written Opinion for PCT/GB2012/050085, dated May 28, 2013 (11 pages).
Michalon et al., "Enzyme coupling method on calibrated nylon spheres: application to the selective trypsinization of histones in chromatin," Biochem Biophys Res Commun. 167(1):9-15 (1990).
Migneault et al., "Glutaraldehyde: behavior in aqueous solution, reaction with proteins, and application to enzyme crosslinking," Biotechniques. 37(5):790-802 (2004).
Silva et al., "Laccase immobilization on enzymatically functionalized polyamide 6,6 fibres," Enzyme Microb Technol. 41:867-75 (2007).
Talbert et al., "Chitosan-tethered microspheres for lactase immobilization," J Mol Catal B Enzym. 78:78-84 (2012).
U.S. Appl. No. 15/344,120, He et al.
U.S. Appl. No. 15/414,314, He et al.

* cited by examiner

Cylindrical, Spherical and Perfect Sphere Size Parameters

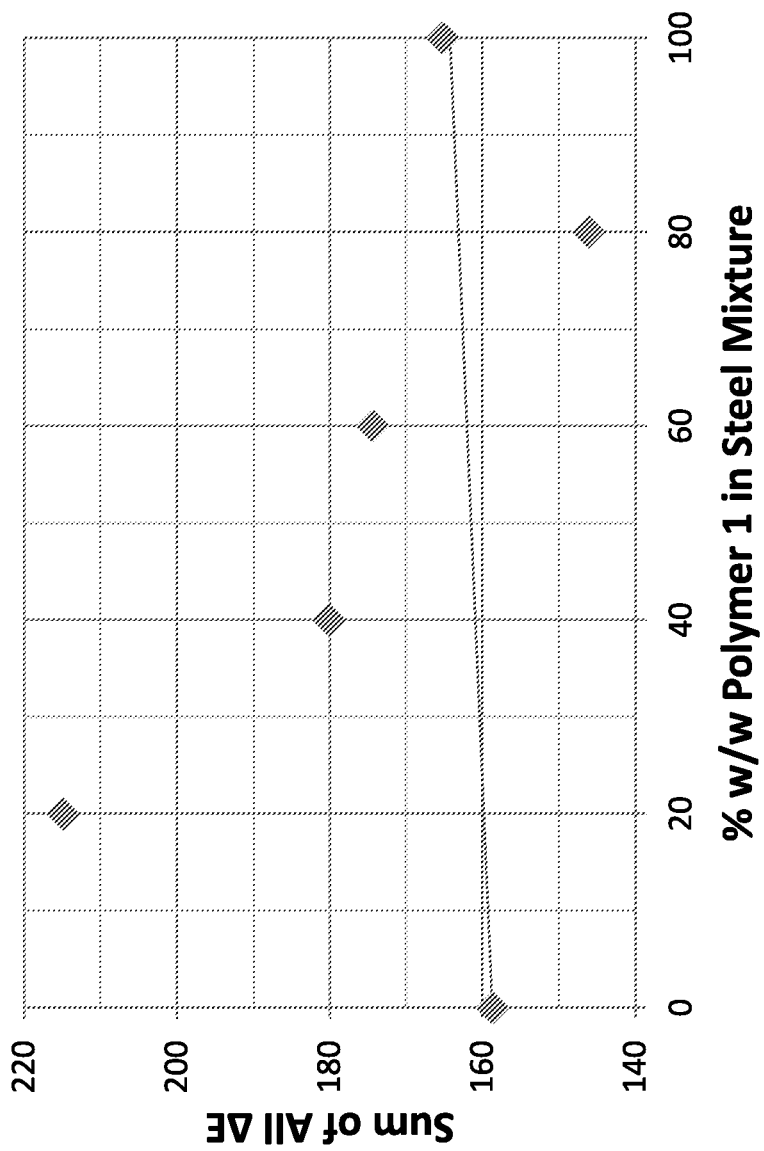

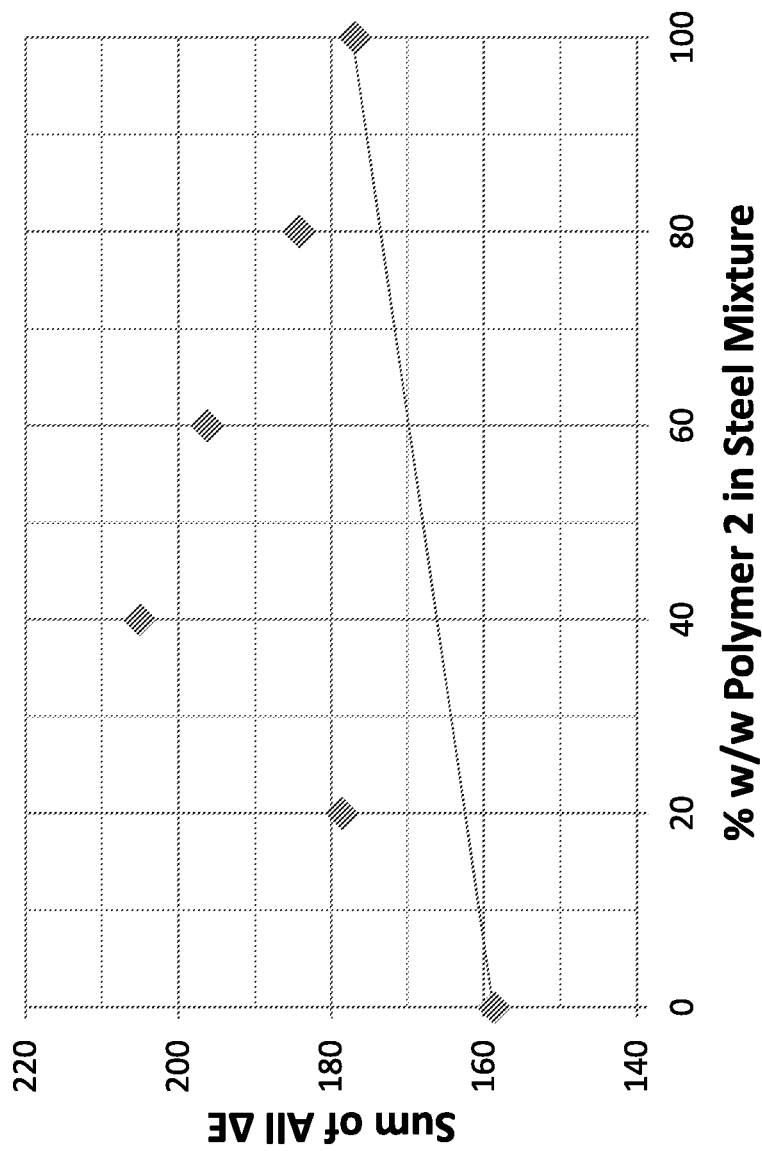

CLEANING METHOD

CROSS-REFERENCE TO RELATED APPLICATIONS

This application is filed under the provisions of 35 U.S.C. §371 and claims the priority of International Patent Application No. PCT/GB2012/050085 filed on Jan. 16, 2012 which in turn claims priority of Great Britain Application No. 1100627.7 filed on Jan. 14, 2011, the contents of which are incorporated by reference herein for all purposes.

FIELD OF THE INVENTION

The present invention relates to the aqueous cleaning of soiled substrates, specifically textile fibres and fabrics, using a cleaning system which comprises non-polymeric particles, or mixtures of polymeric and non-polymeric particles. More specifically, the invention is concerned with the use of such particles in a system adapted to optimise mechanical interaction between said particles and substrates, and to facilitate the easy removal of said particles from said substrates after completion of cleaning, thereby facilitating re-use of the particles for subsequent cleaning operations.

BACKGROUND TO THE INVENTION

Aqueous cleaning processes are a mainstay of both domestic and industrial textile fabric washing. On the assumption that the desired level of cleaning is achieved, the efficacy of such processes is usually characterised by their levels of consumption of energy, water and detergent. In general, the lower the requirements with regard to these three components, the more efficient the washing process is deemed. The downstream effect of reduced water and detergent consumption is also significant, as this minimises the need for disposal of aqueous effluent, which is both extremely costly and detrimental to the environment.

Such washing processes, whether involving domestic washing machines or their industrial equivalents (usually referred to as washer extractors) involve aqueous submersion of fabrics followed by soil removal, aqueous soil suspension, and water rinsing. In general, the higher the level of energy (or temperature), water and detergent which is used, the better the cleaning. The key issue, however, concerns water consumption, as this sets the energy requirements (in order to heat the wash water), and the detergent dosage (to achieve the desired detergent concentration). In addition, the water usage level defines the mechanical action of the process on the fabric, which is another important performance parameter; this is the agitation of the cloth surface during washing, which plays a key role in releasing embedded soil. In aqueous processes, such mechanical action is provided by the water usage level in combination with the drum design for any particular washing machine. In general terms, it is found that the higher the water level in the drum, the better the mechanical action. Hence, there is a dichotomy created by the desire to improve overall process efficiency (i.e. the reduction of energy, water and detergent consumption), and the need for efficient mechanical action in the wash. For domestic washing in particular there are defined wash performance standards specifically designed to discourage the use of such higher levels in practice, in addition to the obvious cost penalties which are associated with such usage.

Current efficient domestic washing machines have made significant strides towards minimising their consumptions of energy, water and detergent. EU Directive 92/75/CEE sets a standard which defines washing machine energy consumption in kWh/cycle (cotton setting at 60° C.), such that an efficient domestic washing machine will typically consume <0.19 kWh/kg of washload in order to obtain an 'A' rating. If water consumption is also considered, then 'A' rated machines use <9.7 liters/kg of washload.

The most recent system in the EU (arising from Commission Delegated Regulation 1061/2010, introduced from 20 Dec. 2011) has, however, seen a switch to a new rating system for domestic washing machines. This considers annualised energy and water consumptions, and derives an energy efficiency index (EEI) based on a defined weekly set of wash cycles (3 off 60° C. at full load, 2 off 60° C. at half load, and 2 off 40° C. at half load). The total energy consumption of these washes (plus weighted values for the 'off mode' and 'left-on' mode power consumptions) is then averaged to a daily figure (by division by 7). The resulting figure is then multiplied by 220—the assumed average number of washes per annum, to calculate the annual energy consumption (AEc) in KWh. The EEI is then calculated by dividing the AEc by a standard annual energy consumption (SAEc=[47×c]+51.7), where c is the washload capacity for the machine. An EEI value of <46 results in an A+++ energy efficiency rating. A similar approach is taken with the water consumption to arrive at the AWc (the water consumption for the same weekly set of wash cycles, averaged to daily consumption and annualised). This value is, however, simply displayed as an annual consumption in liters/annum.

Detergent dosage is then driven by manufacturer recommendations but, again, in the domestic market, for a concentrated liquid formulation, a figure of 35 ml (or 37 g) for a 4-6 kg washload in soft and medium hardness water, increasing to 52 ml (or 55 g) for a 6-8 kg washload (or in hard water or for very dirty items) is typical (see, for example, Unilever pack dosage instructions for Persil® Small & Mighty). Hence, for a 4-6 kg washload in soft/medium water hardness, this equates to a detergent dosage of 7.4-9.2 g/kg whilst, for a 6-8 kg washload (or in hard water or for very dirty items), the range is 6.9-9.2 g/kg.

Energy, water and detergent consumptions in the industrial washing process (washer extractors) are considerably different, however, and usages all three resources are less constrained, since these are principal factors in reducing cycle time—which is, of course, more of a consideration than in the case of domestic processes. For a typical industrial washer extractor (25 kg washload rated and above), energy consumption is >0.30 kWh/kg, water usage is at ~20 liters/kg, and detergent is much more heavily dosed than for domestic washing. The exact level of detergent used will depend on the amount of soiling, but a range of 18-70 g/kg is representative.

Thus, it can be taken from the above discussion that it is the performance levels in the domestic sector which set the highest standard for an efficient fabric washing process, and that these are: an energy consumption of <0.19 kWh/kg or an EEI of <46, a water usage of <9.7 liters/kg, and a detergent dosage of approximately 8.0 g/kg (8.5 ml/kg). However, as previously observed, it is becoming increasingly difficult to reduce the water (and, hence, energy and detergent) levels in a purely aqueous process, due to the minimum requirement to wet the fabric thoroughly, the need to provide sufficient excess water to suspend the soil removed in an aqueous liquor and, finally, the need to rinse the fabric.

Heating of the wash water is then the principal use of energy, and a minimum level of detergent becomes necessary in order for an effective concentration to be reached at the operating wash temperature. Means to improve mechanical action without increasing the water level used would, therefore, make any aqueous wash process significantly more efficient (i.e. yield further reductions in energy, water and detergent consumption). It should be noted that mechanical action itself has a direct effect on the detergent level, since the greater the level of soil removal which is achieved through physical force, the less that is required of the detergent chemistry. However, increasing the mechanical action in a purely aqueous washing process has certain associated drawbacks. Fabric creasing readily occurs in such processes, and this acts to concentrate the stresses from mechanical action at each crease, resulting in localised fabric damage. Prevention of such fabric damage (i.e. fabric care) is of primary concern to the domestic consumer and the industrial user.

In the light of these challenges which are associated with aqueous washing processes, the present inventors have previously devised a new approach to the problem, which allows the deficiencies demonstrated by the methods of the prior art to be overcome. The method which is provided eliminates the requirement for the use of large volumes of water, but is still capable of providing an efficient means of cleaning and stain removal, whilst also yielding economic and environmental benefits.

Thus, in WO-A-2007/128962 there is disclosed a method and formulation for cleaning a soiled substrate, the method comprising the treatment of the moistened substrate with a formulation comprising a multiplicity of polymeric particles, wherein the formulation is free of organic solvents. Preferably, the substrate is wetted so as to achieve a substrate to water ratio of between 1:0.1 to 1:5 w/w, and optionally, the formulation additionally comprises at least one cleaning material, which typically comprises a surfactant, which most preferably has detergent properties. In preferred embodiments, the substrate comprises a textile fibre and the polymeric particles may, for example, comprise particles of polyamides, polyesters, polyalkenes, polyurethanes or their copolymers, but are most preferably in the form of nylon beads.

The use of this particle-based cleaning method, however, presents a requirement for the cleaning particles to be efficiently separated from the cleaned substrate at the conclusion of the cleaning operation, and this issue is addressed in WO-A-2010/094959, which provides a novel design of cleaning apparatus requiring the use of two internal drums capable of independent rotation, and which finds application in both industrial and domestic cleaning processes.

In co-pending WO-A-2011/064581, there is provided a further apparatus which facilitates efficient separation of cleaning particles from the cleaned substrate at the conclusion of the cleaning operation, and which comprises a perforated drum and a removable outer drum skin which is adapted to prevent the ingress or egress of fluids and solid particulate matter from the interior of the drum, the cleaning method requiring attachment of the outer skin to the drum during a wash cycle, after which the skin is removed prior to operating a separation cycle to remove the cleaning particles, following which the cleaned substrate is removed from the drum.

In a further development of the apparatus of WO-A-2011/064581, there is disclosed in co-pending WO-A-2011/098815 a process and apparatus which provides for continuous circulation of the cleaning particles during the cleaning process, and thereby dispenses with the requirement for the provision of an outer skin.

The apparatus and methods disclosed in the foregoing prior art documents have been highly successful in providing an efficient means of cleaning and stain removal which also yields significant economic and environmental benefits.

In co-pending PCT Patent Application No. PCT/GB2011/052117 the polymeric particle-based cleaning method, and the separation of said cleaning particles from the cleaned substrate, are both further improved by careful control of polymeric particle size, shape and density, as well as process parameters. A cleaning process is achieved which facilitates excellent cleaning performance at surprisingly low cleaning temperatures (i.e. low energy), and with reduced levels of added detergents, whilst also maintaining the original low water consumption. In the present invention, even further improvements to this cleaning process are achieved by the use of enhanced methods which move away from the use of only polymeric cleaning particles.

The present inventors have now established that certain non-polymeric particles can enhance the mechanical action in the wash process such that, most particularly in combination with polymeric particles, there is a surprising benefit achieved in overall cleaning performance. Specifically, high density (>3.5 g/cm$^3$) non-polymeric particles of similar size and shape to those described in PCT Patent Application No. PCT/GB2011/052117 have been found to provide this enhanced effect. The non-polymeric particles are significantly more dense than the polymeric particles they are mixed with, due to the nature of the different materials used (the specific examples of non-polymeric particles are glass and metal). Hence, the benefit of the present invention is in still further enhancing cleaning performance even at the already low cleaning temperatures, reduced levels of added detergents, and low water consumptions disclosed in PCT Patent Application No. PCT/GB2011/052117.

As previously discussed, effective targets for these savings would be significant reductions below an energy consumption of 0.19 kWh/kg or an EEI of <46, a water usage of <9.7 liters/kg, and a detergent dosage of approximately 8.0 g/kg (8.5 ml/kg). The current invention allows a new washing process capable of achieving these targets, whilst also facilitating reduced localised fabric damage in the washed substrate by virtue of the increased uniformity of the mechanical action of the particles with the fabric surface.

In addition, removal levels of the non-polymeric particles from the fabric washload at the end of the cleaning process are at least as efficient as for the removal of polymeric particles in PCT Patent Application No. PCT/GB2011/052117.

SUMMARY OF THE INVENTION

The present invention derives from an appreciation on the part of the inventors that optimum cleaning performance can be achieved as a result of improved mechanical interaction between substrate and cleaning media, as well as controlled soil adsorption and absorption onto the surface of the media. This can be effected as a function of the chemical composition, number, size, shape, density, and hence mass, of the particles of cleaning media and the free volume within the vessel in which the cleaning operation takes place, in addition to the G force dictated by its speed of rotation. Free volume in this context refers to the space inside the vessel which remains unoccupied by washload or particulate cleaning media, and G force is defined on the basis of the centripetal forces which are acting.

For the particle itself, mechanical interaction with the substrate is a function of its size, shape and density. Shape is a secondary effect, with cylinders of circular cross section providing more mechanical action than, for example, perfect spheres due to the defined edges at the circumferences of their circular faces. As individual particle size, and therefore mass, increases so does the mechanical action of the particle, but there is a balance with cleaning performance, since a consequence of the use of very large particles is that fewer particles are used to provide the same overall mass of particles. In the case of polymeric particles, that also results in reduced surface area with which soil adsorption and absorption onto the particle surface can occur.

Non-polymeric particles, such as glass and metals, generally rely on mechanical action rather than soil adsorption or absorption in order to effect cleaning. Glasses, ceramics and metals, for example, have chemically inert surfaces, so there is little adsorption and no absorption of soil at the particle surface. The advantage of such non-polymeric particles, however, is that they are much more dense than the equivalent sized and shaped polymeric particles; hence, they have much stronger mechanical actions. In mixing these two particle types therefore, a skilled person might expect that where the mechanical action of the polymeric particle is relatively poor, adding non-polymeric particles would give rise to some improvement in cleaning performance. It could also be expected that this improvement should be governed by the ratio of polymeric to non-polymeric particles, and that a rule of mixtures may apply (i.e. a linear relationship as the mixture ratio changes from 100% polymeric to 100% non-polymeric particles). If the polymer already has reasonably good mechanical action, however, the addition of non-polymeric particles should have less effect.

Surprisingly, however, it has been established that since polymeric particles have relatively poor mechanical action, the addition of non-polymeric particles has increased cleaning performance far beyond what could reasonably be expected. Indeed, improvements have been achieved which greatly exceed that predicted by a rule of mixtures approach, as described above. In addition it has been found that the nature of the non-polymeric particle itself is a key factor in generating this improvement. Specifically, only non-polymeric particles of density >3.5 g/cm$^3$ (mass >190 mg) show significant cleaning benefits for the particle size ranges used. Furthermore, for polymers with reasonably good mechanical action—even such that their cleaning performance exceeds that of the non-polymeric particle added—very considerable improvements in cleaning performance can still be achieved by mixing the two particle types. It has become clear, therefore, that the efficacy of cleaning with polymeric particles can be considerably enhanced by the addition of certain non-polymeric particles, to an extent beyond what might reasonably be expected by a skilled person.

The use of non-polymeric particles alone can also enhance cleaning performance over conventional aqueous wash processes, but to a lesser extent than is achieved by the use of mixtures of non-polymeric and polymeric particles.

Thus, according to a first aspect of the present invention, there is provided a method for the cleaning of a soiled substrate, said method comprising treating the substrate with a solid particulate cleaning material and wash water, said treatment being carried out in an apparatus comprising a drum comprising perforated side walls and having a capacity of between 5 and 50 liters for each kg of fabric in the washload, wherein said solid particulate cleaning material comprises a multiplicity of non-polymeric particles at a particle to fabric addition level of 0.1:1-10:1 by mass, each of said particles being substantially cylindrical or spherical in shape and having an average density in the range of 3.5-12.0 g/cm$^3$ and an average volume in the range of 5-275 mm$^3$, and wherein said drum comprising perforated side walls is rotated at a speed which generates G forces in the range of from 0.05 to 900 G.

In particularly favoured embodiments of the invention, said solid particulate cleaning material additionally comprises a multiplicity of polymeric particles, each of said particles being substantially cylindrical or spherical in shape and having an average density in the range of 0.5-2.5 g/cm$^3$ and an average volume in the range of 5-275 mm$^3$.

The non-polymeric particles may comprise particles of glass, silica, stone, wood, or any of a variety of metals or ceramic materials. Suitable metals include, but are not limited to, zinc, titanium, chromium, manganese, iron, cobalt, nickel, copper, tungsten, aluminium, tin and lead, and alloys thereof. Suitable ceramics include, but are not limited to, alumina, zirconia, tungsten carbide, silicon carbide and silicon nitride.

The polymeric particles may comprise either foamed or unfoamed polymeric materials. Furthermore, the polymeric particles may comprise polymers which are either linear or crosslinked.

The polymeric particles preferably comprise polyalkenes such as polyethylene and polypropylene, polyamides, polyesters or polyurethanes. Preferably, however, said polymeric particles comprise polyamide or polyester particles, most particularly particles of nylon, polyethylene terephthalate or polybutylene terephthalate, most preferably in the form of beads. Said polyamides and polyesters are found to be particularly effective for aqueous stain/soil removal, whilst polyalkenes are especially useful for the removal of oil-based stains.

Optionally, copolymers of the above polymeric materials may be employed for the purposes of the invention. Specifically, the properties of the polymeric materials may be tailored to specific requirements by the inclusion of monomeric units which confer particular properties on the copolymer. Thus, the copolymers may be adapted to attract particular staining materials by comprising monomers which, inter alia, are ionically charged, or include polar moieties or unsaturated organic groups.

In embodiments of the invention wherein said solid particulate cleaning material comprises a multiplicity of non-polymeric particles and a multiplicity of polymeric particles, said polymeric particles may be present in any amount, typically from 0.1% to 99.9%. Consequently, embodiments of the invention are envisaged wherein the ratio of non-polymeric particles to polymeric particles may be anywhere from 99.9%:0.1% to 0.1%:99.9%. Certain embodiments envisage ratios of from 90.0%:10.0% to 25.0%:75.0%, or from 85.0%15.0% to 40.0%:60.0%, of non-polymeric particles to polymeric particles.

In further embodiments of the invention, said non-polymeric particles may comprise coated non-polymeric particles. Most particularly, said non-polymeric particles may comprise a non-polymeric core material and a shell comprising a coating of a polymeric material. In a particular embodiment, said core may comprise a metal core, typically a steel core, and said shell may comprise a polyamide coating, for example a coating of nylon.

In preferred embodiments of the invention, the drum comprising perforated side walls comprises a rotatably mounted cylindrical cage.

The volume of wash water added to the system provides a wash water to fabric ratio which is typically between 5.0:1 and 0.1:1 w/w, and the overall volumes of water which are employed (including rinse water) are significantly lower than in conventional washing processes.

In typical embodiments of the invention, the formulation additionally comprises at least one additional cleaning agent, which most preferably comprises at least one detergent composition.

The generation of suitable G forces, in combination with the action of the solid particulate cleaning material, is a key factor in achieving an appropriate level of mechanical action on the soiled substrate. G is a function of the drum size and the speed of rotation of the drum and, specifically, is the ratio of the centripetal force generated at the inner surface of the cage to the static weight of the washload. Thus, for a cage of inner radius r (m), rotating at R (rpm), with a washload of mass M (kg), and an instantaneous tangential velocity of the cage v (m/s), and taking g as the acceleration due to gravity at 9.81 m/s$^2$:

Centripetal force=$Mv^2/r$

Washload static weight=$Mg$ $v=2\pi rR/60$

Hence, $G=4\pi^2 r^2 R^2/3600$ $rg=4\pi^2 rR^2/3600$ $g=1.18\times 10^{-3} rR^2$ When, as is usually the case, r is expressed in centimeters, rather than meters, then:

$G=1.118\times 10^{-5} rR^2$

Hence, for a drum of radius 49 cm rotating at 800 rpm, G=350.6.

In an embodiment of the invention, a cylindrical drum having a diameter of 98 cm is rotated at a speed of 30-800 rpm in order to generate G forces of 0.49-350.6 at different stages during the cleaning process. In examples of alternative embodiments of the invention, a 48 cm diameter drum rotating at 1600 rpm can generate 688 G, whilst a 60 cm diameter drum at the same speed of rotation generates 860 G.

In preferred embodiments of the invention, the claimed method additionally provides for separation and recovery of the non-polymeric particles, and polymeric particles which are preferably present, and these may then be re-used in subsequent washes.

The non-polymeric particles, and polymeric particles which are preferably present, are of such a shape and size as to allow for good flowability and intimate contact with the soiled substrate, which typically comprises a textile fabric. A variety of shapes of particles can be used, such as cylindrical, spherical or cuboid; appropriate cross-sectional shapes can be employed including, for example, annular ring, dog-bone and circular. Non-polymeric particles comprising naturally occurring materials such as stone may have various shapes, dependent on their propensity to cleave in a variety of different ways during manufacture. Most preferably, however, said particles comprise cylindrical or spherical beads.

It has been established that the combination of particle size, shape and density is such that the mechanical action of the particle with the fabric is optimised, it being sufficiently vigorous to provide effective cleaning but, at the same time, uniform and gentle enough to reduce fabric damage when compared with conventional aqueous processes. It is, in particular, the uniformity of the mechanical action generated by the chosen particles across the entire fabric surface that is the key factor in this regard. The particle parameters are also controlled so as to allow for easy separation of the particles from the fabric washload at the end of the wash process. Thus, particle size and shape may be controlled in order to minimise entanglement with the fabric, and the combination of suitable particle density with low G (<1) and high free volume in the washing machine tumbling process together promote particle removal under gravity through the perforations in the drum sidewall.

All particles may have smooth or irregular surface structures and can be of solid or hollow construction. Non-polymeric particles have an average density in the range of from 3.5-12.0 g/cm$^3$, preferably from 5.0-10.0 g/cm$^3$, more preferably from 6.0-9.0 g/cm$^3$. Polymeric particles have an average density in the range of 0.5-2.5 g/cm$^3$, preferably from 0.55-2.0 g/cm$^3$, more preferably from 0.6-1.9 g/cm$^3$. The average volume of both the non-polymeric and polymeric particles is in the range of 5-275 mm$^3$, preferably from 8-140 mm$^3$, more preferably from 10-120 mm$^3$.

In the case of cylindrical particles—both non-polymeric and polymeric—of oval cross section, the major cross section axis length, a, is typically in the range of from 2.0-6.0 mm, more typically from 2.2-5.0 mm, most typically from 2.4-4.5 mm, and the minor cross section axis length, b, is typically in the range of from 1.3-5.0 mm, more typically from 1.5-4.0 mm, and most typically from 1.7-3.5 mm (a>b). The length of such particles, h, is typically from 1.5-6.0 mm, more typically from 1.7-5.0 mm, and most typically from 2.0-4.5 mm (h/b is typically in the range of from 0.5-10).

For cylindrical particles—both non-polymeric and polymeric—of circular cross section, the typical cross section diameter, $d_c$, is in the range of from 1.3-6.0 mm, more typically from 1.5-5.0 mm, and most typically from 1.7-45.5 mm. The typical length, $h_c$, of such particles is again from 1.5-6.0 mm, more typically from 1.7-5.0 mm, and most typically from 2.0-4.5 mm ($h_c/d_c$ is typically in the range of from 0.5-10).

In the case of both non-polymeric and polymeric spherical particles (not perfect spheres) the diameter, $d_s$, is typically in the range of from 2.0-8.0 mm, more typically in the range of from 2.2-5.5 mm, and most typically from 2.4-5.0 mm.

In embodiments where the particles, whether non-polymeric or polymeric, are perfect spheres, the diameter, $d_{ps}$, is typically in the range of from 2.0-8.0 mm, more typically from 3.0-7.0 mm, and most typically from 4.0-6.5 mm.

In accordance with the present invention, the selection of specific particle type (non-polymeric and polymeric if used) for a given cleaning operation is particularly important in optimising fabric care. Thus, particle size, shape, mass and material must all be considered carefully in respect of the particular substrate which is to be cleaned, so that particle selection is dependent on the nature of the garments to be cleaned, i.e. whether they comprise cotton, polyester, polyamide, silk, wool, or any of the other common textile fibres or blends which are commonly in use.

Said rotatably mounted cylindrical cage is comprised in any suitable cleaning apparatus comprising a housing and access means, allowing access to the interior of said cylindrical cage, suitable examples of which are disclosed in WO-A-2010/094959, WO-A-2011/064581 and WO-A-2011/098815.

Optionally, said rotatably mounted cylindrical cage may be concentrically located within a rotatably mounted cylindrical drum having a greater diameter than said cage, wherein said cage and said drum are concentrically located within a stationary cylindrical drum having a greater diameter than said rotatably mounted drum, and wherein said rotatably mounted cylindrical cage and said rotatably mounted cylindrical drum are adapted to rotate independently.

More preferably, however, said rotatably mounted cylindrical cage is mounted in a first chamber within said housing means, which also comprises a second chamber located adjacent said cylindrical cage. Said apparatus typically also comprises at least one recirculation means and a multiplicity of delivery means.

In certain embodiments of the invention, said apparatus additionally comprises sealing means, removably attached to the outer surface of the cylindrical side walls of said rotatably mounted cylindrical cage, and adapted to prevent the ingress or egress of fluids and solid particulate matter from the interior of said cage.

In alternative embodiments of the invention, said apparatus additionally comprises pumping means, and said rotatably mounted cylindrical cage comprises a drum comprising perforated side walls, wherein up to 60% of the surface area of said side walls comprises perforations, and said perforations comprise holes having a diameter of no greater than 25.0 mm.

As a consequence of employing the cleaning method of the present invention, excellent cleaning performance may be achieved whilst using reduced levels of detergents and much lower cleaning temperatures (i.e. lower energy consumption), whilst also maintaining low water consumption levels. Thus, cleaning operations according to the invention, whilst possible at temperatures of up to 95° C., are typically carried out at temperatures not exceeding 75° C., and optimum performance is generally achieved at 5-40° C. As an approximate guide, it is found that if a conventional aqueous cleaning process requires a wash temperature of T° C., then the process according to the present invention will provide superior cleaning at temperatures in the range of T-10° C. to T-25° C.

Removal of the particles from the fabric washload at the end of the cleaning process is expedited on the basis of the specific size, shape and density of the particles used, and also by control of process parameters, in order to enable bead re-use in subsequent cleaning processes.

Thus, the present inventors have provided a process for the cleaning of soiled substrates which provides improved cleaning performance, reduced damage to the substrate being cleaned, and significantly reduced consumption of energy, detergent and water. These improvements result from improved mechanical interaction between the cleaning material and the substrate, which result from the careful selection of both apparatus parameters and the physical properties of the solid particulate cleaning material as hereinbefore defined. Furthermore, by virtue of this selection of parameters and properties, the process allows for the efficient collection of the solid particulate cleaning material after completion of the process such that it may be re-used in subsequent cleaning procedures.

A further aspect of the invention envisages a cleaning composition as hereinbefore defined comprising a solid particulate cleaning composition and at least one additional cleaning agent. Typically, said at least one additional cleaning agent comprises at least one detergent composition.

Said solid particulate cleaning material comprises a multiplicity of non-polymeric particles and, in particularly favoured embodiments of the invention, said solid particulate cleaning material additionally comprises a multiplicity of polymeric particles.

BRIEF DESCRIPTION OF THE DRAWINGS

Embodiments of the invention are further described hereinafter with reference to the accompanying drawings, in which:

FIG. 2(a) shows a comparison of the cleaning performance over all stains tested for different polymer 1/steel particle mixtures using the method of the invention.

FIG. 2(b) shows a comparison of the cleaning performance over all stains tested for different polymer 2/steel particle mixtures using the method of the invention

DETAILED DESCRIPTION OF THE INVENTION

Figure 1:
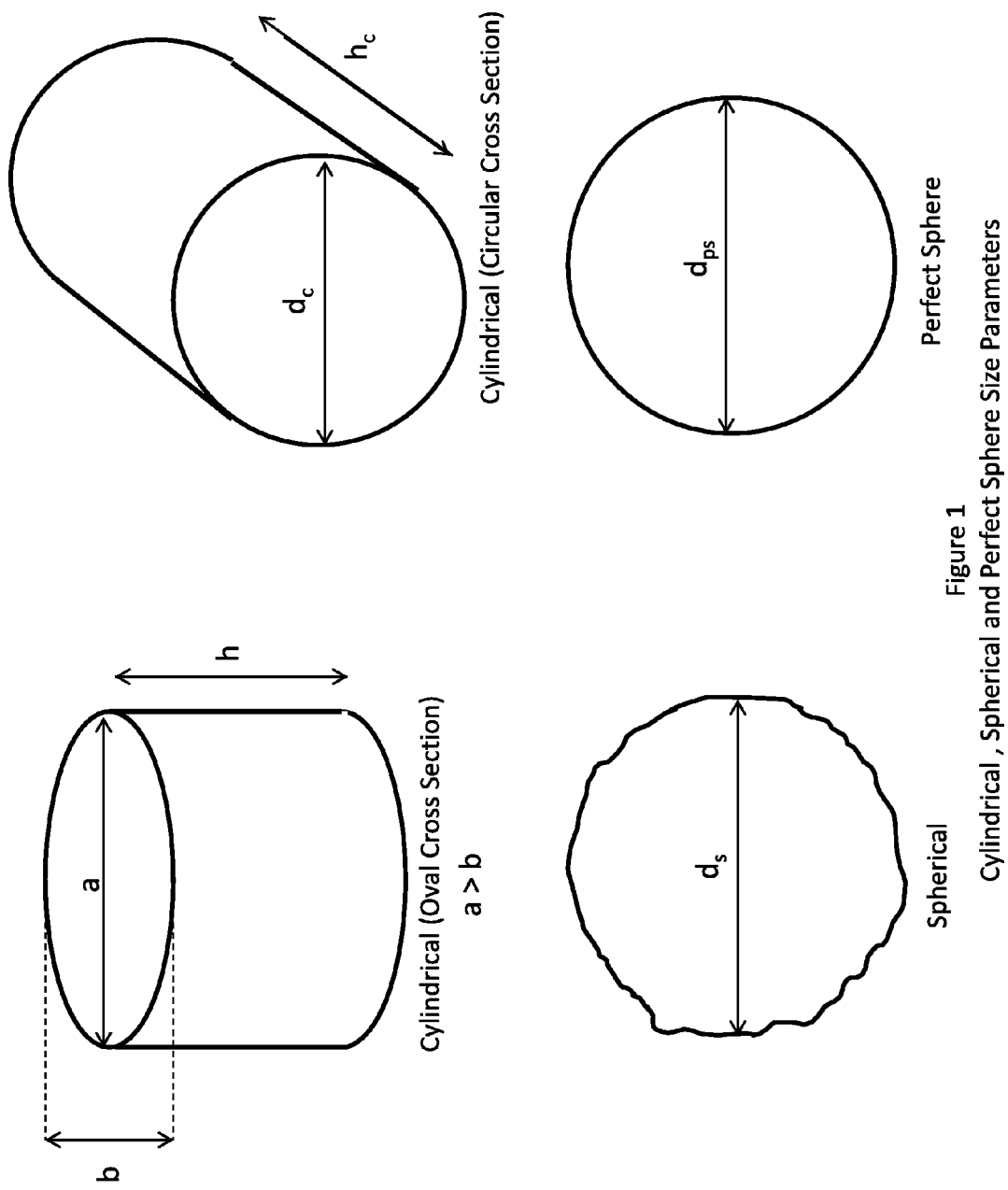
FIG. 1 is a diagrammatic representation of particles which are employed in the method of the invention.

In apparatus employed in the method of the invention, the access means typically comprises a hinged door mounted in the housing, which may be opened to allow access to the inside of the cylindrical cage, and which may be closed in order to provide a substantially sealed system. Preferably, the door includes a window.

Said rotatably mounted cylindrical cage may be mounted vertically within said housing means but, most preferably, is mounted horizontally within said housing means. Consequently, in preferred embodiments of the invention, said access means is located in the front of the apparatus, providing a front-loading facility. When the rotatably mounted cylindrical cage is vertically mounted within the housing means, the access means is located in the top of the apparatus, providing a top-loading facility.

Rotation of said rotatably mounted cylindrical cage is effected by use of drive means, which typically comprises electrical drive means, in the form of an electric motor. Operation of said drive means is effected by control means which may be programmed by an operative.

The method according to the invention preferably comprises performing, in sequence, the steps of:

(a) washing;
(b) first extraction of excess water;
(c) first separation of particles of solid particulate cleaning material;
(d) rinsing;
(e) second extraction of excess water;
(f) optionally repeating steps (d) and (e) at least once; and
(g) second separation of particles of solid particulate cleaning material.

Said solid particulate cleaning material typically comprises a multiplicity of non-polymeric particles and, in particularly favoured embodiments of the invention, said solid particulate cleaning material additionally comprises a multiplicity of polymeric particles.

Said first separation of cleaning particles typically removes >50% of the particles, whilst the second separation of cleaning particles ensures removal of >99% of these particles. Optionally, the first separation of cleaning particles can be extended to provide removal of >99.9% of particles, but it is more efficient to take advantage of steps (d) and (e), as these also inherently remove some particles, before moving to step (g) for final separation. This is particularly true if steps (d) and (e) are repeated.

Preferably, steps (d) and (e) are repeated several times, typically at least 2-3 times, but possibly up to 10 times.

Said rotatably mounted cylindrical cage more preferably has a volume of between 5 and 50 liters for each kg of fabric in the washload. Preferred rates of rotation of said rotatably mounted cylindrical cage are sufficient to give G forces of between 0.05 and 900 G. Typically the washing process is carried out at between 0.05 and 0.95 G, and the rinsing water is added under similar conditions, before extraction of the excess water at higher G force, typically 5.5 to 350 G. Separation of the particles from the fabric is carried out at 0.05 to 0.95 G. After separation, the particles are recovered for re-use in subsequent cleaning processes.

Thus, for a 98 cm diameter cage, the speeds of rotation are advantageously in the range of 10-800 rpm. Typically the washing process is carried out between 10 and 42 rpm and the rinsing water is added under similar conditions, before extraction of the excess water takes place at 100-800 rpm. Separation of the particles from the fabric is carried out at 10-42 rpm, and the separated particles are recovered for re-use in subsequent cleaning processes.

According to the method of the invention, said apparatus operates in conjunction with soiled substrates and cleaning media comprising solid particulate material, which is in the form of a multiplicity of non-polymeric particles which preferably additionally comprises a multiplicity of polymeric particles. These particles are required to be efficiently circulated to promote optimum cleaning performance and the apparatus, therefore, preferably includes circulation means. Thus, the inner surface of the cylindrical side walls of said rotatably mounted cylindrical cage preferably comprises a multiplicity of spaced apart elongated protrusions affixed essentially perpendicularly to said inner surface. Preferably, said protrusions additionally comprise air amplifiers which are typically driven pneumatically and are adapted so as to promote circulation of a current of air within said cage. Typically said apparatus comprises from 3 to 10, most preferably 4, of said protrusions, which are commonly referred to as lifters.

In operation, agitation is provided by rotation of said rotatably mounted cylindrical cage. However, in preferred embodiments of the invention, there is also provided additional agitating means, in order to facilitate the efficient removal of residual solid particulate material at the conclusion of the cleaning operation. Preferably, said agitating means comprises an air jet.

Said housing means is connected to standard plumbing features, thereby preferably providing at least one recirculation means, in addition to a multiplicity of delivery means, by virtue of which at least water and, optionally, cleaning agents such as surfactants, enzymes and bleaches may be introduced into the apparatus. Said apparatus may additionally comprise means for circulating air within said housing means, and for adjusting the temperature and humidity therein. Said means may typically include, for example, a recirculating fan, an air heater, a water atomiser and/or a steam generator. Additionally, sensing means may also be provided for determining the temperature and humidity levels within the apparatus, and for communicating this information to the control means.

According to preferred aspects of the invention, the at least one recirculation means facilitates recirculation of said solid particulate material from a second chamber to said rotatably mounted cylindrical cage, for re-use in subsequent cleaning processes. Preferably, first recirculation means comprises ducting connecting said chamber and said rotatably mounted cylindrical cage. More preferably, said ducting comprises separating means for separating said solid particulate material from water and control means, adapted to control entry of said solid particulate material into said cylindrical cage.

Recirculation of solid particulate matter from said chamber to said rotatably mounted cylindrical cage is achieved by the use of pumping means comprised in said first recirculation means, wherein said pumping means are adapted to deliver said solid particulate matter to said separating means and said control means, adapted to control the re-entry of said solid particulate matter into said rotatably mounted cylindrical cage.

Preferably, said apparatus additionally includes a second recirculation means, allowing for the return of water separated by said separating means to said second chamber, thereby facilitating re-use of said water in an environmentally beneficial manner. Preferably, said chamber comprises additional pumping means to promote circulation and mixing of the contents thereof.

In a typical operation of a cleaning cycle according to the method of the invention, soiled garments are first placed into said rotatably mounted cylindrical cage. Tumbling begins (G<1) and, then, the necessary amount of wash water is added, together with any required additional cleaning agent, to said rotatably mounted cylindrical cage. When the substrate has been uniformly wetted out (typically 1-2 minutes), the solid particulate cleaning material is also added to the rotatably mounted cylindrical cage. Optionally, said materials are introduced via the first recirculation means into the cylindrical cage. Alternatively, said additional cleaning agent may, for example, be pre-mixed with said wash water and added via said separating means located adjacent said cylindrical cage.

During the course of agitation by rotation of the cage, the fluids and a quantity of the solid particulate material exit through the perforations in the cage and into a second chamber of the apparatus. Thereafter, the solid particulate material may be re circulated via the first recirculation means such that it is transferred to said separating means, from which it is returned, in a manner controlled by said control means, to the cylindrical cage for continuation of the washing operation. This process of continuous circulation of the solid particulate material continues throughout the washing operation until cleaning is completed.

Thus, the solid particulate material which exits through the perforations in the walls of said rotatably mounted cylindrical cage and into said second chamber is recirculated and reintroduced through said separation means and, by operation of control means, through said feeder means, back into said cage, thereby to continue the cleaning operation.

Typically, a wash cycle according the method of the invention comprises the steps of:

(i) introducing a solid particulate cleaning material and water into a second chamber of an apparatus as hereinbefore described comprising a rotatably mounted cylindrical cage;

(ii) agitating said solid particulate cleaning material and water;

(iii) loading at least one soiled substrate into said rotatably mounted cylindrical cage via access means;

(iv) closing the access means so as to provide a substantially sealed system;

(v) causing the rotatably mounted cylindrical cage to rotate whilst introducing wash water and any required additional cleaning agent to uniformly wet out the substrate;

(vi) introducing said solid particulate cleaning material into said rotatably mounted cylindrical cage, and operating the apparatus for a wash cycle, wherein said rotatably mounted cylindrical cage continues to rotate, and wherein fluids and solid particulate cleaning material are caused to fall through perforations in said rotatably mounted cylindrical cage into a second chamber in a controlled manner;

(vii) operating pumping means so as to transfer fresh solid particulate cleaning material and recycle used solid particulate cleaning material to separating means;

(viii) operating control means so as to add said fresh and recycled solid particulate cleaning material to said rotatably mounted cylindrical cage in a controlled manner; and (ix) continuing with steps (vi), (vii) and (viii) as required to effect cleaning of the soiled substrate.

Optionally, said solid particulate cleaning material and water may be introduced into said rotatably mounted cylindrical cage via recirculating means. More preferably, however, said solid particulate cleaning material and water are introduced into said rotatably mounted cylindrical cage via dosing means such as, for example, a fixedly mounted spray nozzle. Most conveniently, said spray nozzle may be fixedly mounted on said access means.

Preferably, additional cleaning agents are employed in said method, as further discussed below. Said additional cleaning agents may be added to said second chamber of said apparatus with said solid particulate cleaning material and introduced, via the first recirculation means, into the cylindrical cage. Alternatively, an additional cleaning agent is pre-mixed with water and added to said cylindrical cage via the separating means during step (v). More preferably, however, said additional cleaning agents are added to said cylindrical cage via said dosing means. The method of the invention facilitates the use of reduced quantities of said additional cleaning agents.

In preferred embodiments of the invention, said cleaning agents may be added to said cylindrical cage in multiple dosing steps during the cleaning operation, rather than a single dosing step.

Preferably, pumping of said fresh and recycled solid particulate cleaning material proceeds at a rate sufficient to maintain approximately the same level of cleaning material in said rotatably mounted cylindrical cage throughout the cleaning operation, and to ensure that the ratio of cleaning material to soiled substrate stays substantially constant until the wash cycle has been completed.

On completion of the wash cycle, feeding of solid particulate cleaning material into the rotatably mounted cylindrical cage ceases and the speed of rotation of the cage is gradually increased in order to effect a measure of drying of the cleaned substrate. Some solid particulate material is removed at this stage. Typically, the cage is rotated at a rotation speed of between 100 and 800 rpm in order to achieve drying; for a 98 cm diameter cage, a suitable speed of rotation would be around 600 rpm. Subsequently, rotation speed is reduced and returned to the speed of the wash cycle so as to allow for final removal of the solid particulate cleaning material. After separation, the solid particulate cleaning material is recovered in order to allow for re-use in subsequent cleaning processes.

Optionally, following initial drying at high rpm, said method may additionally comprise a rinsing operation, wherein additional water may be added to said rotatably mounted cylindrical cage in order to effect complete removal of any additional cleaning agent employed in the cleaning operation. Water may be added to said cylindrical cage via said separating means, or via dosing means such as, for example, a fixedly mounted spray nozzle. Most conveniently, said spray nozzle may be fixedly mounted on said access means. Water may also be added by overfilling the second chamber of said apparatus with water such that it enters the first chamber and thereby enters into said rotatably mounted cylindrical cage. Following rotation at the same speed as during the wash cycle, water is removed from said cage by allowing the water level to fall, as appropriate, and again increasing the speed of rotation to, typically, 100-800 rpm in order to achieve a measure of drying of the substrate; a speed of rotation of around 600 rpm would, once again, be appropriate for a 98 cm diameter cage. Said rinsing and drying cycles may be repeated as often as desired.

Optionally, said rinse cycle may be used for the purposes of substrate treatment, involving the addition of treatment agents such as fluorescent brighteners, perfumes, softeners and starch to the rinse water.

Said solid particulate cleaning material is preferably subjected to a cleaning operation in said second chamber by sluicing said chamber with clean water in the presence or absence of a cleaning agent, which may be selected from at least one of surfactants, enzymes and bleaches. Alternatively, cleaning of the solid particulate cleaning material may be achieved as a separate stage in said rotatably mounted cylindrical cage. After cleaning, the solid particulate cleaning material is recovered such that is available for use in subsequent cleaning processes.

Generally, any remaining solid particulate cleaning material on said at least one substrate may be easily removed by shaking the at least one substrate. If necessary, however, further remaining solid particulate cleaning material may be removed by suction means, preferably comprising a vacuum wand.

The method of the invention may be applied to the cleaning of any of a wide range of substrates including, for example, plastics materials, leather, paper, cardboard, metal, glass or wood. In practice, however, said method is principally applied to the cleaning of substrates comprising textile fibres and fabrics, and has been shown to be particularly successful in achieving efficient cleaning of textile fabrics which may, for example, comprise either natural fibres, such as cotton, or man-made and synthetic textile fibres, for example nylon 6,6, polyester, cellulose acetate, or fibre blends thereof.

The solid particulate cleaning material typically comprises a multiplicity of non-polymeric particles which comprise particles of glass, silica, stone, wood, or any of a variety of metals or ceramic materials, which particles may be solid or hollow in structure.

In certain favoured embodiments of the invention, the solid particulate cleaning material additionally comprises a multiplicity of polymeric particles, which may also be solid or hollow in structure, and which comprise polyamide or polyester particles, most particularly particles of nylon, polyethylene terephthalate or polybutylene terephthalate, or copolymers thereof. The polymers may be foamed or unfoamed, and may be linear or crosslinked. Various nylon or polyester homo- or co-polymers may be used including, but not limited to, Nylon 6, Nylon 6,6, polyethylene terephthalate and polybutylene terephthalate. Preferably, the nylon comprises Nylon 6,6 homopolymer having a molecular weight in the region of from 5000 to 30000 Daltons, preferably from 10000 to 20000 Daltons, most preferably from 15000 to 16000 Daltons. The polyester will typically have a molecular weight corresponding to an intrinsic viscosity measurement in the range of from 0.3-1.5 dl/g as measured by a solution technique such as ASTM D-4603.

Optionally, the properties of the copolymers may be adapted, for example in order to attract particular staining materials, by including monomer units in the polymer chain which, inter alia, are ionically charged, or include polar moieties or unsaturated organic groups. Examples of such groups may include, for example, acid or amino groups, or salts thereof, or pendant alkenyl groups.

In said embodiments wherein said solid particulate cleaning material additionally comprises a multiplicity of polymeric particles, said polymeric particles may be present in any amount, typically from 0.1% to 99.9%, so that the ratio of non-polymeric particles to polymeric particles is generally anywhere from 99.9%:0.1% to 0.1%:99.9%. In specific embodiments, ratios of from 90.0%:10.0% to 25.0%:75.0%, or from 85.0%:15.0% to 40.0%:60.0%, of non-polymeric particles to polymeric particles may be employed.

The volume of wash water added to the system is calculated so as to achieve a wash water to fabric ratio which is preferably between 5.0:1 and 0.1:1 w/w; more preferably, the ratio is between 2.0:1 and 0.8:1, with particularly favourable results having been achieved at ratios such as 1.75:1, 1.5:1, 1.2:1 and 1.1:1. Most conveniently, the required amount of water is introduced into the rotatably mounted cylindrical cage of the apparatus after loading of the soiled substrate into said cage. An additional amount of water will migrate into the cage during the circulation of the solid particulate cleaning material, but the amount of carry over is minimised by the action of the separating means.

Whilst the method of the invention envisages the cleaning of a soiled substrate by the treatment of a moistened substrate with a formulation which essentially consists only of a multiplicity of non-polymeric particles, or of a multiplicity of non-polymeric particles and polymeric particles, in the absence of any further additives, in more preferred embodiments the formulation additionally comprises at least one additional cleaning agent. Said at least one cleaning agent preferably comprises at least one detergent composition.

The principal components of the detergent composition comprise cleaning components and post-treatment components. Typically, the cleaning components comprise surfactants, enzymes and bleach, whilst the post-treatment components include, for example, anti-redeposition additives, perfumes and optical brighteners.

However, the detergent formulation may optionally include one or more other additives such as, for example builders, chelating agents, dye transfer inhibiting agents, dispersants, enzyme stabilizers, catalytic materials, bleach activators, polymeric dispersing agents, clay soil removal agents, suds suppressors, dyes, structure elasticizing agents, fabric softeners, starches, carriers, hydrotropes, processing aids and/or pigments.

Examples of suitable surfactants may be selected from non-ionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

The compositions may include one or more detergent enzymes which provide cleaning performance and/or fabric care benefits. Examples of suitable enzymes include, but are not limited to, hemicellulases, peroxidases, proteases, other cellulases, other xylanases, lipases, phospholipases, esterases, cutinases, pectinases, keratanases, reductases, oxidases, phenoloxidases, lipoxygenases, ligninases, pullulanases, tannases, pentosanases, malanases, [beta]-glucanases, arabinosidases, hyaluronidase, chondroitinase, laccase, and amylases, or mixtures thereof. A typical combination may comprise a mixture of enzymes such as protease, lipase, cutinase and/or cellulase in conjunction with amylase.

Optionally, enzyme stabilisers may also be included amongst the cleaning components. In this regard, enzymes for use in detergents may be stabilised by various techniques, for example by the incorporation of water-soluble sources of calcium and/or magnesium ions in the compositions.

The compositions may include one or more bleach compounds and associated activators. Examples of such bleach compounds include, but are not limited to, peroxygen compounds, including hydrogen peroxide, inorganic peroxy salts, such as perborate, percarbonate, perphosphate, persilicate, and mono persulphate salts (e.g. sodium perborate tetrahydrate and sodium percarbonate), and organic peroxy acids such as peracetic acid, monoperoxyphthalic acid, diperoxydodecanedioic acid, N,N'-terephthaloyl-di(6-aminoperoxycaproic acid), N,N'-phthaloylaminoperoxycaproic acid and amidoperoxyacid. Bleach activators include, but are not limited to, carboxylic acid esters such as tetraacetylethylenediamine and sodium nonanoyloxybenzene sulfonate.

Suitable builders may be included in the formulations and these include, but are not limited to, the alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

The compositions may also optionally contain one or more copper, iron and/or manganese chelating agents and/or one or more dye transfer inhibiting agents.

Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof.

Optionally, the detergent formulations can also contain dispersants. Suitable water-soluble organic materials are the homo- or co-polymeric acids or their salts, in which the polycarboxylic acid may comprise at least two carboxyl radicals separated from each other by not more than two carbon atoms.

Said anti-redeposition additives are physico-chemical in their action and include, for example, materials such as polyethylene glycol, polyacrylates and carboxy methyl cellulose.

Optionally, the compositions may also contain perfumes Suitable perfumes are generally multi-component organic chemical formulations which can contain alcohols, ketones, aldehydes, esters, ethers and nitrile alkenes, and mixtures thereof. Commercially available compounds offering sufficient substantivity to provide residual fragrance include Galaxolide (1,3,4,6,7,8-hexahydro-4,6,6,7,8,8-hexamethylcyclopenta(g)-2-benzopyran), Lyral (3- and 4-(4-hydroxy-4-methyl-pentyl) cyclohexene-1-carboxaldehyde and Ambroxan ((3aR,5aS,9aS,9bR)-3a,6,6,9a-tetramethyl-2,4,5,5a,7,8,9,9b-octahydro-1H-benzo[e][1] benzofuran). One example of a commercially available fully formulated perfume is Amour Japonais supplied by Symrise® AG.

Suitable optical brighteners fall into several organic chemical classes, of which the most popular are stilbene derivatives, whilst other suitable classes include benzoxazoles, benzimidazoles, 1,3-diphenyl-2-pyrazolines, coumarins, 1,3,5-triazin-2-yls and naphthalimides. Examples of such compounds include, but are not limited to, 4,4'-bis[[6-anilino-4(methylamino)-1,3,5-triazin-2-yl]amino]stilbene-2,2'-disulfonic acid, 4,4'-bis[[6-anilino-4-[(2-hydroxyethyl)methylamino]-1,3,5-triazin-2-yl]amino]stilbene-2,2'-disulphonic acid, disodium salt, 4,4'-Bis[[2-anilino-4-[bis(2-hydroxyethyl)amino]-1,3,5-triazin-6-yl]amino]stilbene-2,2'-disulfonic acid, disodium salt, 4,4'-bis[(4,6-dianilino-1,3,5-triazin-2-yl)amino]stilbene-2,2'-disulphonic acid, disodium salt, 7-diethylamino-4-methylcoumarin, 4,4'-Bis[(2-anilino-4-morpholino-1,3,5-triazin-6-yl)amino]-2,2'-stilbenedisulfonic acid, disodium salt, and 2,5-bis(benzoxazol-2-yl)thiophene.

Said agents may be used either alone or in any desired combination and may be added to the cleaning system at appropriate stages during the cleaning cycle in order to maximise their effects.

In any event, however, when the method of the invention is performed in the presence of at least one additional cleaning agent, the quantity of said cleaning agent required in order to achieve satisfactory cleaning performance is significantly reduced from the quantities required with the methods of the prior art.

The ratio of solid particulate cleaning material to substrate is generally in the range of from 0.1:1 to 10:1 w/w, preferably in the region of from 0.5:1 to 5:1 w/w, with particularly favourable results being achieved with a ratio of between 1:1 and 3:1 w/w, and especially at around 2:1 w/w. Thus, for example, for the cleaning of 5 g of fabric, 10 g of non-polymeric particles, or the same mass of a mixture of non-polymeric and polymeric particles, optionally coated with surfactant, would be employed. The ratio of solid particulate cleaning material to substrate is maintained at a substantially constant level throughout the wash cycle.

The method of the present invention may be used for either small or large scale batchwise processes and finds application in both domestic and industrial cleaning processes.

As previously noted, the method of the invention finds particular application in the cleaning of textile fabrics. The conditions employed in such a cleaning system do, however, allow the use of significantly reduced temperatures from those which typically apply to the conventional wet cleaning of textile fabrics and, as a consequence, offer significant environmental and economic benefits. Thus, typical procedures and conditions for the wash cycle require that fabrics are generally treated according to the method of the invention at, for example, temperatures of between 5 and 40° C. for a duration of between 5 and 45 minutes in a substantially sealed system. As an approximate guide, it is found that if a conventional aqueous cleaning process requires a wash temperature of T° C., then the process according to the present invention will provide superior cleaning at temperatures in the range of T-10° C. to T-25° C. Thereafter, additional time is required for the completion of the rinsing and particle separation stages of the overall process, so that the total duration of the entire cycle is typically in the region of 1 hour.

The results obtained are very much in line with those observed when carrying out conventional wet (or dry) cleaning procedures with textile fabrics. The extent of cleaning and stain removal achieved with fabrics treated by the method of the invention is seen to be very good, with particularly outstanding results being achieved in respect of hydrophobic stains and aqueous stains and soiling, which are often difficult to remove. The energy requirement, the total volume of water used, and the detergent consumption of the method of the invention are all significantly lower than those levels associated with the use of conventional aqueous washing procedures, again offering significant advantages in terms of cost and environmental benefits.

The method of the invention also shows benefits in terms of reducing washing-related fabric damage. As previously observed, fabric creasing readily occurs in conventional aqueous washing, and this acts to concentrate the stresses from the mechanical action of the wash at each crease, resulting in localised fabric damage. Prevention of such fabric damage (or fabric care) is of primary concern to the domestic consumer and industrial user. The addition of non-polymeric particles, or mixtures of non-polymeric and polymeric particles, according to the method of the invention effectively reduces creasing in the wash by acting as a pinning layer on the fabric surface in order to help prevent the folding action. The particles also inhibit interaction between separate pieces of fabric in the wash by acting as a separation or spacing layer, thereby reducing entanglement which is another major cause of localised fabric damage. In the presently disclosed method, mechanical action is still present but, critically, this is much more uniformly distributed as a result of the action of the non-polymeric particles. It is the localised aspect of the damage that determines the lifetime of a garment under multiple washing.

Thus, the method of the present invention provides for enhanced cleaning performance in comparison with the methods of the prior art under equivalent energy, water and detergent conditions; alternatively, equivalent cleaning performance may be achieved at lower levels of all of energy water and detergent, together with reduced fabric damage, as illustrated in the Examples appended hereto. Furthermore, removal of the particles from the fabric washload at the end of the cleaning process is expedited on the basis of the specific size, shape and density of the particles used, and also by control of process parameters, in order to enable particle re-use in subsequent cleaning processes.

In a specific preferred embodiment of the invention, a soiled substrate is placed in a rotatably mounted cylindrical cage of 98 cm diameter and a detergent formulation comprising surfactant and enzymes is added in combination with a small amount of wash water at ambient temperature via a spray nozzle mounted on the door of the apparatus. The cage is rotated at 40 rpm to give a G force of 0.88. Thereafter, the solid particulate cleaning material is introduced into said cage from said second chamber and the process, comprising continuous recirculation of said material, is continued for 5-50 minutes. A further amount of wash water containing bleach is added during this time at either ambient or elevated temperature (in the former instance, the bleach is a low temperature activated compound). Rotation is continued for several minutes after the bleach solution has been added. Circulation is then discontinued in order to end the wash process.

The extraction stage of the cycle is then carried out in order to remove water from the system, by rotating for about 2 minutes at a high G force of greater than 5.5; preferably, said cage is rotated at about 600 rpm in order to generate a G force of around 197.2. High speed rotation then ceases and a low G tumble (at around 40 rpm) is carried out for approximately 5 minutes to remove the majority (>50%) of the solid particulate cleaning material remaining in the washload. Rinse water is then sprayed into said cage via the nozzle for a few minutes, after which further rotation of the cage at around 600 rpm takes place to remove the rinse water. The rinse process may be repeated several times, generally up to 10 times, more preferably up to 5 times, typically around 3 times. The rinse water which is added is not sufficient to submerge the fabric in water, and is only used to the extent of resaturating the fabric ahead of the next extraction stage. Optionally, fluorescent brighteners, perfumes, conditioners and the like may be added during the course of the final spray rinse, following which the cage is again rotated at low G (40 rpm) in order to allow for removal of the remaining solid particulate cleaning material. The clean fabric may then be removed from the apparatus.

Further, in a typical example of an operating cycle according to the method of the invention, an initial addition of solid particulate cleaning material (approximately 43 kg) is added to a washload of soiled substrate (15 kg) in a 98 cm diameter rotatably mounted cylindrical cage, whilst rotating to generate 0.88 G (40 rpm). Thereafter, further solid particulate cleaning material (10 kg) is pumped into said rotatably mounted cylindrical cage via the separating means and control means approximately every 30 seconds throughout the duration of the wash cycle which may typically continue for around 30 minutes. The system is thereby designed to pump and add solid particulate cleaning material at a sufficient rate to maintain roughly the same level of solid particulate cleaning material in the rotatably mounted cylindrical cage (approximately 2.9:1 by weight, for 43 kg of beads and 15 kg of fabric) throughout the wash.

Thus, during the wash cycle, the solid particulate cleaning material is continually falling out of the rotatably mounted cylindrical cage through its perforations, and is being recycled and added, together with fresh cleaning material, via the separating means and control means. This process may either be controlled manually, or operated automatically. The rate of exit of the solid particulate cleaning material from the rotatably mounted cylindrical cage is essentially controlled by means of its specific design. The key parameters in this regard include the size of the perforations, the number of perforations, the arrangement of the perforations within the cage and the G force (or rotational speed) which is employed.

Generally, the perforations are sized at around 2-3 times the average particle diameter of the solid particulate cleaning material which, in a typical example, results in perforations having a diameter of no greater than 25.0 mm. In a preferred embodiment of the invention, a rotatably mounted cylindrical cage would be drilled so that only around 34% of the surface area of the cylindrical walls of the cage comprises perforations. Preferably, the perforations are banded in stripes or distributed evenly over the cylindrical walls of the rotatably mounted cylindrical cage, but could be exclusively located, for example, in one half of the cage.

The rate of exit of the solid particulate cleaning material from the rotatably mounted cylindrical cage is also affected by the speed of rotation of said cage, with higher rotation speeds increasing the G force, although at G>1 the fabric adheres to the sides of the cage and prevents exit of the cleaning material. Hence, slower rotational speeds have been found to provide optimum results in this regard, as they allow the beads to fall from the fabric and through the perforations as the fabric opens out more during tumbling. Rotational speeds resulting in a G force of <1 are therefore required (10-42 rpm in a 98 cm diameter cage). The G force (or rotational speed) is also controlled so as to maximise the beneficial effect of the mechanical action of the cleaning material on the substrate, and the most suitable G is generally found to be in the region of 0.9 G (40 rpm in a 98 cm diameter cage).

In addition, the moisture level in the wash also has an effect, with wetter substrates tending to retain cleaning material for a longer time than drier substrates. Consequently, overwetting of substrate can, if necessary, be employed in order to further control the rate of exit of solid particulate cleaning material.

On completion of the wash cycle, addition of solid particulate cleaning material to the rotatably mounted cylindrical cage is ceased, and the cage rpm is gradually increased to give a G force of about 197.2 (600 rpm in a 98 cm diameter cylindrical cage) for about 2 minutes in order to extract some liquid and dry the substrate to an extent. High speed rotation then ceases and a low G tumble (at around 40 rpm) is carried out for approximately 5 minutes to remove the majority (>50%) of the solid particulate cleaning material remaining in the washload. The rinsing cycles are then carried out as hereinbefore described and the rotation G and rotational speed are finally returned to the same values of <1 and low (40) rpm as in the wash cycle in order to complete the removal of cleaning material; this removal of particles generally takes around 20 minutes, as do each of the wash and rinse cycles in a typical operation, giving a total overall cycle time in the region of 1 hour.

The method of the invention has been shown to be successful in the removal of cleaning material from the cleaned substrate after processing and tests have indicated particle removal efficacy such that on average <20 particles per garment remain in the washload at the end of the bead separation cycle. Generally, this can be further reduced to an average of <10 particles per garment and, in optimised cases wherein a 20 minute separation cycle is employed, an average of <5 particles per garment is typically achieved. With drier garments, achieved using higher G forces during the water extraction stage of the process, this particle per garment figure can be even further reduced.

Additionally, it has been demonstrated that re-utilisation of the non-polymeric and, when used, polymeric particles in the manner described operates well, so that particles can be satisfactorily re-used in the cleaning procedure, with little deterioration in performance generally observed with recycled particles.

The invention will now be illustrated, though without in any way limiting the scope thereof, by reference to the following examples and associated illustrations.

EXAMPLES

Example 1—Non-Polymeric Particles

Cleaning trials were carried out in order to test the efficacy of two readily available non-polymeric particulate cleaning materials versus a control with no particles added (see Table 1 and FIG. 1).

TABLE 1

PARTICULATE CLEANING MATERIALS & CONTROL

| Particle Type | Particle Shape | Particle Diameter (mm) | Particle Volume (mm$^3$) | Particle Density (g/cm$^3$) | Particle Mass (mg) |
|---|---|---|---|---|---|
| Glass | Perfect Sphere | $d_{ps} = 4.7$ | 54.4 | 3.5 | 191 |
| Steel | Perfect Sphere | $d_{ps} = 4.4$ | 44.6 | 7.9 | 351 |
| None (Control) | N/A | N/A | N/A | N/A | N/A |

Washes were carried out in a sealed wash rig (a rotatably mounted drum of 50 cm diameter and 70 cm depth, equipped with lifter 10 cm tall) according to the conditions described in Table 2.

TABLE 2

WASH CONDITIONS

| Particle Type | Washload Mass (kg) | Wash Temperature (° C.) | Wash Duration (mins) | Particle:Cloth Ratio (w/w) | Water:Cloth Ratio (w/w) | Detergent (g/kg) | Rinsed |
|---|---|---|---|---|---|---|---|
| Glass | 4.0 | Ambient (20° C.) | 20 | 1:1 | 1.2:1 | 30.0 | Yes |
| Steel | 4.0 | Ambient (20° C.) | 20 | 1:1 | 1.2:1 | 30.0 | Yes |
| None (Control) | 4.0 | Ambient (20° C.) | 20 | N/A | 1.2:1 | 30.0 | Yes |

The washload comprised 4.0 kg in total, including 1 WFK PCMS-55_05-05×05 professional laundry stain monitor, and 4 SBL-2004 sebum cloths, with the remaining washload made up with cotton ballast. The detergent used was Procter & Gamble Professional Ariel® Liquid, at the manufacturer's recommended dosage. At the end of the 20 minute wash cycle, the load was rinsed in a domestic washing machine (BEKO WM5120W—standard rinse cycle), and the stain monitors allowed to air dry. Each wash was repeated twice. The particles were rinsed clean between washes.

A Konica Minolta CM-3600A spectrophotometer was used to record the CIE Lab L, a and b colour co-ordinates of the various stains on the WFK PCMS-55_05-05×05 stain monitor, and these were then used to calculate ΔE as a measure of the degree of cleaning achieved versus the unwashed equivalent (the higher the ΔE value the better the cleaning). The results are shown in Table 3 (averaged over the repeat washes), with comments made on the basis that a difference of 1 unit in ΔE is discernible by eye.

As can be seen from Table 3, there is no significant cleaning benefit from using the glass particles versus the control. There is only 1 stain (10D) giving a positive result, with 7 at parity performance, and 5 with poorer performance. The steel particles however, show improvement with 6 stains (10C, 10D, 90RM, 90PB, 10N and 90MF), whilst parity is achieved for 5 stains, with only 2 showing poorer performance.

TABLE 3

WASH TEST RESULTS

| WFK Stain Monitor Coding | Stain Type | No Particle ΔE (Control) | Glass Particle ΔE | Steel Particle ΔE | Glass Particle ΔE − No Particle ΔE | Steel Particle ΔE − No Particle ΔE |
|---|---|---|---|---|---|---|
| 10C | Pigment/lanolin on cotton | 7.3 | 7.7 | 8.9 | <1 | +1.6 |
| 20C | Pigment/lanolin on polyester/cotton | 4.7 | 3.4 | 3.9 | −1.3 | <1 |
| 90LI | Red wine on cotton, aged (IEC 456) | 17.1 | 16.8 | 15.6 | <1 | −1.5 |
| 10D | Sebum/pigment on cotton | 8.5 | 9.7 | 12.4 | +1.2 | +3.9 |
| 20D | Sebum/pigment on polyester/cotton | 11.2 | 8.5 | 11.8 | −2.7 | <1 |
| 10U | Curry on cotton | 9.6 | 9.6 | 9.7 | <1 | <1 |
| 10M | Motor oil/pigment on cotton | 4.7 | 5.6 | 3.6 | <1 | <1 |
| 90RM | Soot/mineral oil on cotton (IEC 456) | 4.6 | 4.9 | 7.6 | <1 | +3.0 |
| 90PB | Blood on cotton, aged (IEC 456) | 47.8 | 37.0 | 51.0 | −10.8 | +3.2 |
| 10N | Egg/pigment on cotton | 18.8 | 15.2 | 21.1 | −3.6 | +2.3 |
| 10R | Starch/pigment on cotton | 4.1 | 4.2 | 3.2 | <1 | <1 |
| 10PPM | Vegetable fat/milk/pigment on cotton | 9.4 | 5.0 | 6.7 | −4.4 | −2.7 |
| 90MF | Cocoa on cotton, aged (IEC 456) | 7.6 | 7.8 | 9.1 | <1 | +2.5 |

As the glass and steel particles here are essentially the same size and shape, it is their density (and hence their mass) difference which is the key factor. The higher density (and mass) of the steel particles obviously increases their mechanical action and, therefore, cleaning capability. Hence, it can be concluded that there is a threshold density for a given non-polymeric particle size and shape, to generate enough mechanical action for the particle to show improved cleaning performance. For the specific non-polymeric particles tested here, it is evident that this threshold is >3.5 g/cm$^3$ (or, similarly, a particle mass threshold exists at >190 mg).

Example 2—Mixtures of Non-Polymeric and Polymeric Particles

Cleaning trials were also carried out to test the efficacy of mixtures of non-polymeric and polymeric particulate cleaning materials, versus the 100% w/w non-polymeric and 100% w/w polymeric options and, again, versus a control with no particles added (see Table 4 and FIG. 1).

particle:cloth). A 60%/40% polymer/steel particles mixture (w/w) contained 4.8 kg of polymer particles and 3.2 kg of steel particles, etc.

The washload comprised 4.0 kg in total, including 1 WFK PCMS-55_05-05×05 professional laundry stain monitor, and 4 SBL-2004 sebum cloths, with the remaining washload made up with cotton ballast. The detergent used was

TABLE 4

PARTICULATE CLEANING MATERIALS & CONTROL

| Particle Type | Particle Shape | Particle Diameter (mm) | a (mm) | b (mm) | h (mm) | Particle Volume (mm$^3$) | Particle Density (g/cm$^3$) | Particle Mass (mg) |
|---|---|---|---|---|---|---|---|---|
| Steel | Perfect Sphere | $d_{ps}$ = 4.4 | N/A | N/A | N/A | 44.6 | 7.9 | 351 |
| Polymer 1 (BASF Ultramid ® B36, Nylon 6) | Spherical | $d_s$ = 2.7 | N/A | N/A | N/A | 10.4 | 1.1 | 13 |
| Polymer 2 (INVISTA Polyclear ® 1101, polyethylene terephthalate) | Cylindrical (Oval Cross Section) | N/A | 3.0 | 2.2 | 2.1 | 11.1 | 1.4 | 16 |
| None (Control) | N/A | N/A | N/A | N/A | N/A | N/A | N/A | N/A |

Washes were carried out in a sealed wash rig (a rotatably mounted drum of 50 cm diameter and 70 cm depth, equipped with lifter 10 cm tall) according to the conditions described in Table 5.

Procter & Gamble Professional Ariel® Liquid, at the manufacturer's recommended dosage. At the end of the 20 minute wash cycle, the load was rinsed in a domestic washing machine (BEKO WM5120W—standard rinse cycle), and

TABLE 5

WASH CONDITIONS

| Particle Type | Washload Mass (kg) | Wash Temperature (° C.) | Wash Duration (mins) | Particle:Cloth Ratio (w/w) | Water:Cloth Ratio (w/w) | Detergent (g/kg) | Rinsed |
|---|---|---|---|---|---|---|---|
| Steel | 4.0 | Ambient (20° C.) | 20 | 2:1 | 1.2:1 | 30.0 | Yes |
| Polymer 1 (BASF Ultramid ® B36, Nylon 6) | 4.0 | Ambient (20° C.) | 20 | 2:1 | 1.2:1 | 30.0 | Yes |
| Polymer 1/ Steel Mixtures (w/w) 20%/80% 40%/60% 60%/40% 20%/80% | 4.0 | Ambient (20° C.) | 20 | 2:1 | 1.2:1 | 30.0 | Yes |
| Polymer 2 (INVISTA Polyclear ® 1101, polyethylene terephthalate) | 4.0 | Ambient (20° C.) | 20 | 2:1 | 1.2:1 | 30.0 | Yes |
| Polymer 2/ Steel Mixtures (w/w) 20%/80% 40%/60% 60%/40% 20%/80% | 4.0 | Ambient (20° C.) | 20 | 2:1 | 1.2:1 | 30.0 | Yes |
| None (Control) | 4.0 | Ambient (20° C.) | 20 | N/A | 1.2:1 | 30.0 | Yes |

For the purposes of clarity, it should be pointed out that the particle:cloth ratio was maintained constant for all of the washes tested. Hence for example, a 20%/80% polymer/steel particles mixture (w/w), contained 1.6 kg of polymer particles and 6.4 kg of steel particles (total 8.0 kg, i.e. 2:1 the stain monitors allowed to air dry. Each wash was repeated twice. The particles were rinsed clean between washes.

A Konica Minolta CM-3600A spectrophotometer was used to record the CIE Lab L, a and b colour co-ordinates of the various stains on the WFK PCMS-55_05-05×05 stain monitor, and these were then used to calculate ΔE as a measure of the degree of cleaning achieved versus the unwashed equivalent (the higher the ΔE value the better the cleaning). The results are shown in Tables 6(a) & (b) (averaged over the repeat washes), with comments made on the basis that a difference of 1 unit in ΔE is discernible by eye.

TABLE 6(a)

WASH TEST RESULTS

| WFK Stain Monitor Coding | Stain Type | No Particle ΔE (Control) | Steel Particle ΔE | Polymer 1 Particle ΔE | Polymer 1/Steel Mixtures ΔE | Polymer 2 Particle ΔE | Polymer 2/Steel Mixtures ΔE |
|---|---|---|---|---|---|---|---|
| 10C | Pigment/lanolin on cotton | 7.3 | 10.6 | 9.4 | 20%/80% = 12.8<br>40%/60% = 11.3<br>60%/40% = 10.1<br>80%/20% = 9.1 | 11.5 | 20%/80% = 11.7<br>40%/60% = 12.5<br>60%/40% = 11.8<br>80%/20% = 11.3 |
| 20C | Pigment/lanolin on polyester/cotton | 4.7 | 3.3 | 4.7 | 20%/80% = 5.7<br>40%/60% = 4.9<br>60%/40% = 4.6<br>80%/20% = 3.9 | 4.5 | 20%/80% = 4.6<br>40%/60% = 6.3<br>60%/40% = 4.8<br>80%/20% = 4.3 |
| 90LI | Red wine on cotton, aged (IEC 456) | 17.1 | 15.9 | 16.3 | 20%/80% = 17.0<br>40%/60% = 16.5<br>60%/40% = 15.8<br>80%/20% = 16.1 | 14.0 | 20%/80% = 15.7<br>40%/60% = 16.8<br>60%/40% = 15.7<br>80%/20% = 15.3 |
| 10D | Sebum/pigment on cotton | 8.5 | 10.6 | 11.2 | 20%/80% = 14.1<br>40%/60% = 11.9<br>60%/40% = 11.9<br>80%/20% = 11.5 | 11.7 | 20%/80% = 13.0<br>40%/60% = 12.9<br>60%/40% = 12.1<br>80%/20% = 11.7 |
| 20D | Sebum/pigment on polyester/cotton | 11.2 | 13.0 | 13.1 | 20%/80% = 17.6<br>40%/60% = 14.6<br>60%/40% = 12.5<br>80%/20% = 10.3 | 11.0 | 20%/80% = 12.4<br>40%/60% = 14.4<br>60%/40% = 14.0<br>80%/20% = 12.0 |
| 10U | Curry on cotton | 9.6 | 9.9 | 10.1 | 20%/80% = 10.4<br>40%/60% = 10.2<br>60%/40% = 9.7<br>80%/20% = 8.2 | 8.9 | 20%/80% = 9.0<br>40%/60% = 10.6<br>60%/40% = 9.2<br>80%/20% = 9.3 |
| 10M | Motor oil/pigment on cotton | 4.7 | 5.4 | 5.6 | 20%/80% = 8.0<br>40%/60% = 6.8<br>60%/40% = 5.6<br>80%/20% = 5.5 | 7.4 | 20%/80% = 7.8<br>40%/60% = 6.8<br>60%/40% = 6.9<br>80%/20% = 7.3 |
| 90RM | Soot/mineral oil on cotton (IEC 456) | 4.6 | 4.1 | 6.8 | 20%/80% = 10.6<br>40%/60% = 6.8<br>60%/40% = 6.1<br>80%/20% = 4.4 | 7.2 | 20%/80% = 9.8<br>40%/60% = 8.5<br>60%/40% = 9.8<br>80%/20% = 8.1 |
| 90PB | Blood on cotton, aged (IEC 456) | 47.8 | 49.4 | 51.5 | 20%/80% = 51.8<br>40%/60% = 49.7<br>60%/40% = 50.2<br>80%/20% = 42.4 | 47.3 | 20%/80% = 47.1<br>40%/60% = 51.9<br>60%/40% = 50.1<br>80%/20% = 49.5 |
| 10N | Egg/pigment on cotton | 18.8 | 16.1 | 17.2 | 20%/80% = 22.1<br>40%/60% = 18.4<br>60%/40% = 18.6<br>80%/20% = 17.2 | 18.6 | 20%/80% = 17.1<br>40%/60% = 19.2<br>60%/40% = 20.0<br>80%/20% = 21.2 |
| 10R | Starch/pigment on cotton | 4.1 | 3.3 | 2.3 | 20%/80% = 7.1<br>40%/60% = 5.1<br>60%/40% = 3.7<br>80%/20% = 3.0 | 5.3 | 20%/80% = 5.2<br>40%/60% = 7.3<br>60%/40% = 7.7<br>80%/20% = 5.5 |
| 10PPM | Vegetable fat/milk/pigment on cotton | 9.4 | 7.7 | 9.2 | 20%/80% = 24.2<br>40%/60% = 14.2<br>60%/40% = 16.0<br>80%/20% = 6.3 | 18.9 | 20%/80% = 15.8<br>40%/60% = 24.9<br>60%/40% = 22.3<br>80%/20% = 20.8 |
| 90MF | Cocoa on cotton, aged (IEC 456) | 7.6 | 9.4 | 7.8 | 20%/80% = 13.5<br>40%/60% = 9.7<br>60%/40% = 9.6<br>80%/20% = 8.2 | 10.6 | 20%/80% = 9.4<br>40%/60% = 13.0<br>60%/40% = 11.8<br>80%/20% = 7.9 |
| SUM OF ALL ΔE | | 155.4 | 158.7 | 165.2 | 20%/80% = 214.9<br>40%/60% = 180.1<br>60%/40% = 174.4<br>80%/20% = 146.1 | 176.9 | 20%/80% = 178.6<br>40%/60% = 205.1<br>60%/40% = 196.2<br>80%/20% = 184.2 |

TABLE 6(b)

WASH TEST RESULTS

| WFK Stain Monitor Coding | Stain Type | No Particle ΔE (Control) | Steel Particle ΔE – No Particle ΔE | Polymer 1 Particle ΔE – No Particle ΔE | Polymer 1/Steel Mixtures ΔE – No Particle ΔE | Polymer 2 Particle ΔE – No Particle ΔE | Polymer 2/Steel Mixtures ΔE – No Particle ΔE |
|---|---|---|---|---|---|---|---|
| 10C | Pigment/lanolin on cotton | 7.3 | +3.3 | +2.1 | 20%/80% = +5.5<br>40%/60% = +4.1<br>60%/40% = +2.9<br>80%/20% = +1.8 | 4.2 | 20%/80% = +4.4<br>40%/60% = +5.3<br>60%/40% = +4.5<br>80%/20% = +4.1 |
| 20C | Pigment/lanolin on polyester/cotton | 4.7 | −1.4 | <1 | 20%/80% = +1.0<br>40%/60% = <1<br>60%/40% = <1<br>80%/20% = <1 | <1 | 20%/80% = <1<br>40%/60% = +1.6<br>60%/40% = <1<br>80%/20% = <1 |
| 90LI | Red wine on cotton, aged (IEC 456) | 17.1 | −1.2 | <1 | 20%/80% = <1<br>40%/60% = <1<br>60%/40% = −1.3<br>80%/20% = −1.0 | −3.1 | 20%/80% = −1.4<br>40%/60% = <1<br>60%/40% = −1.4<br>80%/20% = −1.8 |
| 10D | Sebum/pigment on cotton | 8.5 | +2.1 | +2.7 | 20%/80% = +5.6<br>40%/60% = +3.5<br>60%/40% = +3.4<br>80%/20% = +3.0 | +3.2 | 20%/80% = +4.5<br>40%/60% = +4.4<br>60%/40% = +3.6<br>80%/20% = +3.2 |
| 20D | Sebum/pigment on polyester/cotton | 11.2 | +1.8 | +1.9 | 20%/80% = +6.3<br>40%/60% = +3.4<br>60%/40% = +1.3<br>80%/20% = <1 | <1 | 20%/80% = +1.2<br>40%/60% = +3.2<br>60%/40% = +2.7<br>80%/20% = <1 |
| 10U | Curry on cotton | 9.6 | <1 | <1 | 20%/80% = <1<br>40%/60% = <1<br>60%/40% = <1<br>80%/20% = −1.4 | <1 | 20%/80% = <1<br>40%/60% = +1.0<br>60%/40% = <1<br>80%/20% = <1 |
| 10M | Motor oil/pigment on cotton | 4.7 | <1 | <1 | 20%/80% = +3.3<br>40%/60% = +2.1<br>60%/40% = <1<br>80%/20% = <1 | 2.8 | 20%/80% = +3.2<br>40%/60% = +2.1<br>60%/40% = +2.2<br>80%/20% = +2.6 |
| 90RM | Soot/mineral oil on cotton (IEC 456) | 4.6 | <1 | +2.2 | 20%/80% = +6.0<br>40%/60% = +2.2<br>60%/40% = +1.5<br>80%/20% = <1 | 2.6 | 20%/80% = +5.2<br>40%/60% = +3.9<br>60%/40% = +5.2<br>80%/20% = +3.5 |
| 90PB | Blood on cotton, aged (IEC 456) | 47.8 | +1.6 | +3.7 | 20%/80% = +4.0<br>40%/60% = +1.9<br>60%/40% = +2.4<br>80%/20% = −5.4 | <1 | 20%/80% = <1<br>40%/60% = +4.1<br>60%/40% = +2.3<br>80%/20% = +1.7 |
| 10N | Egg/pigment on cotton | 18.8 | −2.7 | −1.6 | 20%/80% = +3.3<br>40%/60% = <1<br>60%/40% = <1<br>80%/20% = −1.6 | <1 | 20%/80% = −1.6<br>40%/60% = <1<br>60%/40% = +1.2<br>80%/20% = +2.5 |
| 10R | Starch/pigment on cotton | 4.1 | <1 | −1.8 | 20%/80% = +3.0<br>40%/60% = +1.0<br>60%/40% = <1<br>80%/20% = −1.1 | +1.2 | 20%/80% = +1.1<br>40%/60% = +3.2<br>60%/40% = +3.6<br>80%/20% = +1.4 |
| 10PPM | Vegetable fat/milk/pigment on cotton | 9.4 | −1.7 | <1 | 20%/80% = +14.8<br>40%/60% = +4.8<br>60%/40% = +6.6<br>80%/20% = −3.1 | +9.5 | 20%/80% = +6.4<br>40%/60% = +15.6<br>60%/40% = +13.0<br>80%/20% = +11.4 |
| 90MF | Cocoa on cotton, aged (IEC 456) | 7.6 | +1.8 | <1 | 20%/80% = +5.9<br>40%/60% = +2.1<br>60%/40% = +2.0<br>80%/20% = +1.6 | +3.0 | 20%/80% = +1.8<br>40%/60% = +5.4<br>60%/40% = +4.2<br>80%/20% = <1 |

As can be seen from Tables 6(a) & (b) therefore, the steel particle again shows cleaning benefit versus the no particle control (improvement with 5 stains—10C, 10D, 20D, 90PB and 90MF, parity for 4 stains, and 4 with poorer performance). The higher particle:cloth w/w ratio here has changed the balance of cleaning performance across the stain range slightly, but overall improvement in cleaning is still evident. The polymer 1 particle also shows cleaning benefit versus the no particle control (improvement with 5 stains—10C, 10D, 20D, 90RM and 90PB, parity for 6 stains, and 2 with poorer performance). It is surprising therefore, that the mixture of steel and polymer 1 particles performs so well across the whole stain range, and not just the stains cleaned well here by the individual particles alone. If the 20% polymer 1/80% steel particles w/w mixture is considered for example, the cleaning performance shows improvement on all stains except 90LI and 10 U, which both show parity performance. Indeed, the range of polymer 1/steel particle mixtures showing benefit over the individual particles can be seen in FIG. 2(a). Here the sum of the ΔE values for all of the stain types has been plotted against particle mixture composition (from Table 6(a)). There is clearly a synergy in mixing these particles beyond what might reasonably be expected given their individual performances. The line joining the 100% steel particles w/w and 100% polymer 1 particles w/w data points represents a simple rule of mixtures here, to show what might be expected. The point at 80% polymer 1/20% steel particles w/w falling below this line is believed to be an anomaly (see FIG. 2(b)).

This pattern is repeated with the mixture of steel and polymer 2 particles. If the 40% polymer 2/60% steel particles w/w mixture is considered for example, the cleaning performance shows improvement on all stains except 90LI and 10N, which show parity performance. The range of polymer 2/steel particle mixtures showing benefit over the individual particles can be seen in FIG. 2(b). Here again, the sum of the ΔE values for all of the stain types has been plotted against particle mixture composition (from Table 6(a)). The improvement here is so marked that it would appear all mixtures of these two particle types show improved cleaning performance versus what might be expected from the rule of mixtures.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for the cleaning of a soiled substrate, said method comprising treating the substrate with at least a non-polymeric solid particulate cleaning material and wash water, said treatment being carried out in an apparatus comprising a drum comprising perforated side walls and having a capacity of between 5 and 50 liters for each kg of fabric in the washload, wherein said solid particulate cleaning material comprises a multiplicity of non-polymeric particles at a particle to fabric addition level of 0.1:1-10:1 by mass, each of said particles being substantially cylindrical or spherical in shape and having an average density in the range of 3.5-12.0 g/cm$^3$ and an average volume in the range of 5-275 mm$^3$, and wherein said drum comprising perforated side walls is rotated at a speed which generates G forces in the range of from 0.05 to 900 G.

2. The method as claimed in claim 1 wherein said non-polymeric particles comprise particles of glass, silica, stone, wood, or any of a variety of metals or ceramic materials, wherein said metal is optionally selected from zinc, titanium, chromium, manganese, iron, cobalt, nickel, copper, tungsten, aluminium, tin and lead, and alloys thereof, and wherein said ceramic material is optionally selected from alumina, zirconia, tungsten carbide, silicon carbide and silicon nitride.

3. The method as claimed in 1 further comprising a multiplicity of polymeric particles, each of said particles being substantially cylindrical or spherical in shape and having an average density in the range of 0.5-2.5 g/cm$^3$ and an average volume in the range of 5-275 mm$^3$.

4. The method as claimed in claim 3 wherein said polymeric particles comprise foamed or unfoamed polymeric materials and/or said polymeric particles comprise linear or crosslinked polymers.

5. The method as claimed in claim 3 wherein said polymeric particles comprise beads of polyalkenes, polyamides, polyesters or polyurethanes, wherein said polyamide optionally comprises Nylon 6 or Nylon 6,6, optionally Nylon 6,6 homopolymer having a molecular weight in the region of from 5000 to 30000 Daltons, and wherein said polyester optionally comprises polyethylene terephthalate or polybutylene terephthalate.

6. The method as claimed in claim 3 wherein said the ratio of said non-polymeric particles to said polymeric particles is from 99.9 w/w %:0.1 w/w % to 0.1 w/w %:99.9 w/w %, optionally from 90.0 w/w %:10.0 w/w % to 25.0 w/w %:75.0 w/w %, optionally from 85.0 w/w %:15.0 w/w % to 40.0 w/w %:60.0 w/w %.

7. The method as claimed in claim 1 wherein said particles comprised in said solid particulate cleaning material are cylindrical and have an oval cross section wherein the major cross section axis length is in the range of from 2.0-6.0 mm and the minor cross section axis length is in the range of from 1.3-5.0 mm, or wherein said particles comprised in said solid particulate cleaning material are cylindrical and have a circular cross section wherein the cross section diameter is in the range of from 1.3-6.0 mm, and wherein the length of said particles is optionally in the range of from 1.5-6.0 mm.

8. The method as claimed in claim 1 wherein said particles comprised in said solid particulate cleaning material are spherical and the diameter is in the range of from 2.0-8.0 mm, wherein said particles are optionally not perfect spheres and the diameter is in the range of from 2.2-5.5 mm, or wherein said particles are optionally perfect spheres and the diameter is in the range of from 3.0-7.0 mm.

9. The method as claimed in claim 1 wherein said non-polymeric particles comprise coated non-polymeric particles, wherein said non-polymeric particles optionally comprise a non-polymeric core material and a shell comprising a coating of a polymeric material, wherein said core optionally comprises a steel core and said shell optionally comprises a coating of nylon.

10. The method as claimed in claim 1 wherein said drum comprising perforated side walls comprises a rotatably mounted cylindrical cage and said method is optionally carried out at temperatures not exceeding 95° C., optionally not exceeding 75° C., optionally in the range of from 5-40° C.

11. The method as claimed in claim 10 wherein said rotatably mounted cylindrical cage is comprised in said apparatus comprising a housing and an access means, allowing access to the interior of said cylindrical cage, and wherein said apparatus optionally comprises at least one of the following features:
   (a) said rotatably mounted cylindrical cage is concentrically located within a rotatably mounted cylindrical drum having a greater diameter than said cage, wherein said cage and said drum are concentrically located within a stationary cylindrical drum having a greater diameter than said rotatably mounted drum, and wherein said rotatably mounted cylindrical cage and said rotatably mounted cylindrical drum are adapted to rotate independently;

(b) said rotatably mounted cylindrical cage is mounted in a first chamber within said housing, which also comprises a second chamber located adjacent said cylindrical cage, and said apparatus optionally additionally comprises at least one recirculation means and a multiplicity of delivery means and/or optionally additionally comprises a seal, removably attached to the outer surface of the cylindrical side walls of said rotatably mounted cylindrical cage, and adapted to prevent the ingress or egress of fluids and solid particulate matter from the interior of said cage, or comprises a pump, wherein said rotatably mounted cylindrical cage comprises a drum comprising perforated side walls, wherein up to 60% of the surface area of said side walls comprises perforations, and said perforations comprise holes having a diameter of no greater than 25.0 mm, and wherein said access means optionally comprises a hinged door mounted in the housing which may be opened to allow access to the inside of the cylindrical cage and which may be closed in order to provide a substantially sealed system.

12. The method as claimed in claim 10 wherein a wash cycle comprises the steps of:
   i. introducing a solid particulate cleaning material and water into a second chamber of said apparatus comprising said rotatably mounted cylindrical cage;
   ii. agitating said solid particulate cleaning material and water;
   iii. loading at least one soiled substrate into said rotatably mounted cylindrical cage via access means;
   iv. closing the access means so as to provide a substantially sealed system;
   v. causing the rotatably mounted cylindrical cage to rotate whilst introducing wash water and any required additional cleaning agent to uniformly wet out the substrate;
   vi. introducing said solid particulate cleaning material and water into said rotatably mounted cylindrical cage and operating the apparatus for a wash cycle, wherein said rotatably mounted cylindrical cage continues to rotate and wherein fluids and solid particulate material are caused to fall through perforations in said rotatably mounted cylindrical cage into a second chamber in a controlled manner;
   vii. transferring fresh solid particulate cleaning material and recycling used solid particulate cleaning material to separating means;
   viii. adding said fresh and recycled solid particulate cleaning material to said rotatably mounted cylindrical cage in a controlled manner; and
   ix. continuing with steps (vi), (vii) and (viii) as required to effect cleaning of the soiled substrate.

13. The method as claimed in claim 1 further comprising separating the solid particulate cleaning material from the substrate on completion of the washing process, recovering said solid particulate cleaning material and re-using said material in subsequent washes and wherein, optionally, following separation and recovery, said solid particulate cleaning material is subjected to a cleaning operation prior to re-use.

14. The method as claimed in claim 1 wherein said apparatus comprises circulation means, adapted to promote circulation of said solid particulate cleaning material.

15. The method as claimed in claim 1 which comprises performing, in sequence, the steps of:
   a. washing;
   b. first extraction of excess water;
   c. first separation of particles of solid particulate cleaning material;
   d. rinsing;
   e. second extraction of excess water;
   f. optionally repeating steps (d) and (e) at least once; and
   g. second separation of particles of solid particulate cleaning material,
   wherein steps (d) and (e) are optionally repeated up to 10 times, and wherein, optionally, said washing process is carried out at between 0.05 and 0.95 G, the rinsing water is added under similar conditions, then extracted at a higher G force of 5.5 to 350 G, and said separation of particles from the fabric is carried out at 0.05 to 0.95 G.

16. The method as claimed in claim 1 wherein at least one additional cleaning agent is employed, wherein said at least one additional cleaning agent is optionally pre-mixed with water and added to said drum comprising perforated side walls via separating means during the introduction of said solid particulate cleaning material and water into said drum comprising perforated side walls via recirculating means, wherein said at least one additional cleaning agent optionally comprises a detergent composition comprising cleaning components and post-treatment components, wherein said cleaning components are optionally selected from surfactants, enzymes and bleach, and wherein said post-treatment components are optionally selected from components anti-redeposition additives, perfumes and optical brighteners.

* * * * *